US008990858B2

(12) United States Patent
Busse et al.

(10) Patent No.: US 8,990,858 B2
(45) Date of Patent: Mar. 24, 2015

(54) SEARCH-BASED MEDIA PROGRAM GUIDE SYSTEMS AND METHODS

(75) Inventors: Martin Busse, Woburn, MA (US); Jimena Velarde, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1288 days.

(21) Appl. No.: 12/493,906

(22) Filed: Jun. 29, 2009

(65) Prior Publication Data

US 2010/0333139 A1 Dec. 30, 2010

(51) Int. Cl.
| | | |
|---|---|---|
| H04N 5/445 | (2011.01) | |
| H04N 21/458 | (2011.01) | |
| H04N 21/431 | (2011.01) | |
| H04N 21/472 | (2011.01) | |
| H04N 21/482 | (2011.01) | |
| H04N 21/47 | (2011.01) | |

(52) U.S. Cl.
CPC ......... H04N 5/44543 (2013.01); H04N 21/458 (2013.01); H04N 21/4314 (2013.01); *H04N 21/47* (2013.01); *H04N 21/47214* (2013.01); *H04N 21/4828* (2013.01)
USPC .................. 725/44; 725/39; 725/45; 725/46; 725/47; 725/53

(58) Field of Classification Search
CPC   H04N 21/458; H04N 21/431; H04N 21/4314
USPC ...................................... 725/37–61
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |

(Continued)

*Primary Examiner* — Nicholas Corbo

(57) ABSTRACT

An exemplary method includes receiving a program guide data search request, associating a time block with the program guide data search request, identifying a set of program guide data associated with the time block, searching the set of program guide data associated with the time block to identify at least one matching media content instance based on the program guide data search request, and generating data representative of a search-based program guide view for display in a graphical user interface, the search-based program guide view exhibiting graphical data representative of the at least one matching media content instance. In certain embodiments, the method further comprises generating a virtual search channel associated with the program guide data search request and providing graphical data representative of the virtual search channel for display in the search-based program guide view. Corresponding methods and systems are also disclosed.

21 Claims, 15 Drawing Sheets

(56) References Cited

U.S. PATENT DOCUMENTS

| | | | | |
|---|---|---|---|---|
| 5,600,711 | A | 2/1997 | Yuen | |
| 5,619,274 | A | 4/1997 | Roop et al. | |
| 5,640,484 | A | 6/1997 | Mankovitz | |
| 5,684,525 | A | 11/1997 | Klosterman | |
| 5,699,107 | A * | 12/1997 | Lawler et al. | 725/58 |
| 5,701,383 | A | 12/1997 | Russo et al. | |
| 5,706,145 | A | 1/1998 | Hindman et al. | |
| 5,727,060 | A | 3/1998 | Young | |
| 5,734,786 | A | 3/1998 | Mankovitz | |
| 5,790,198 | A | 8/1998 | Roop et al. | |
| 5,801,787 | A | 9/1998 | Schein et al. | |
| 5,808,608 | A | 9/1998 | Young et al. | |
| 5,809,204 | A | 9/1998 | Young et al. | |
| 5,812,205 | A | 9/1998 | Milnes et al. | |
| 5,828,945 | A | 10/1998 | Klosterman | |
| 5,870,150 | A | 2/1999 | Yuen | |
| 5,886,746 | A | 3/1999 | Yuen et al. | |
| 5,915,026 | A | 6/1999 | Mankovitz | |
| 5,923,362 | A | 7/1999 | Klosterman | |
| 5,940,073 | A | 8/1999 | Klosterman et al. | |
| 5,949,954 | A | 9/1999 | Young et al. | |
| 5,959,688 | A | 9/1999 | Schein et al. | |
| 5,969,748 | A | 10/1999 | Casement et al. | |
| 5,970,206 | A | 10/1999 | Yuen et al. | |
| 5,974,222 | A | 10/1999 | Yuen et al. | |
| 5,987,213 | A | 11/1999 | Mankovitz et al. | |
| 5,988,078 | A | 11/1999 | Levine | |
| 5,991,498 | A | 11/1999 | Young | |
| 6,002,394 | A | 12/1999 | Schein et al. | |
| 6,016,141 | A | 1/2000 | Knudson et al. | |
| 6,028,599 | A | 2/2000 | Yuen et al. | |
| 6,049,652 | A | 4/2000 | Yuen et al. | |
| 6,052,145 | A | 4/2000 | Macrae et al. | |
| 6,072,983 | A | 6/2000 | Klosterman | |
| 6,075,551 | A | 6/2000 | Berezowski et al. | |
| 6,075,575 | A | 6/2000 | Schein et al. | |
| 6,078,348 | A | 6/2000 | Klosterman et al. | |
| 6,091,882 | A | 7/2000 | Yuen et al. | |
| 6,118,492 | A | 9/2000 | Milnes et al. | |
| 6,133,909 | A | 10/2000 | Schein et al. | |
| 6,137,950 | A | 10/2000 | Yuen | |
| 6,144,401 | A | 11/2000 | Casement et al. | |
| 6,151,059 | A | 11/2000 | Schein et al. | |
| 6,167,188 | A | 12/2000 | Young et al. | |
| 6,177,931 | B1 | 1/2001 | Alexander et al. | |
| 6,216,265 | B1 | 4/2001 | Roop et al. | |
| 6,239,794 | B1 | 5/2001 | Yuen et al. | |
| 6,247,176 | B1 | 6/2001 | Schein et al. | |
| 6,262,722 | B1 | 7/2001 | Allison et al. | |
| 6,263,501 | B1 | 7/2001 | Schein et al. | |
| 6,323,911 | B1 | 11/2001 | Schein et al. | |
| 6,341,195 | B1 | 1/2002 | Mankovitz et al. | |
| 6,341,374 | B2 | 1/2002 | Schein et al. | |
| 6,388,714 | B1 | 5/2002 | Schein et al. | |
| 6,396,546 | B1 | 5/2002 | Alten et al. | |
| 6,412,110 | B1 | 6/2002 | Schein et al. | |
| 6,430,358 | B1 | 8/2002 | Yuen et al. | |
| 6,430,359 | B1 | 8/2002 | Yuen et al. | |
| 6,453,471 | B1 | 9/2002 | Klosterman | |
| 6,460,181 | B1 | 10/2002 | Donnelly | |
| 6,466,734 | B2 | 10/2002 | Yuen et al. | |
| 6,469,753 | B1 | 10/2002 | Klosterman et al. | |
| 6,477,705 | B1 | 11/2002 | Yuen et al. | |
| 6,498,895 | B2 | 12/2002 | Young et al. | |
| 6,505,348 | B1 | 1/2003 | Knowles et al. | |
| 6,538,701 | B1 | 3/2003 | Yuen | |
| 6,549,719 | B2 | 4/2003 | Mankovitz | |
| 6,564,379 | B1 | 5/2003 | Knudson et al. | |
| 6,567,606 | B2 | 5/2003 | Milnes et al. | |
| 6,588,013 | B1 | 7/2003 | Lumley et al. | |
| 6,668,133 | B2 | 12/2003 | Yuen et al. | |
| 6,687,906 | B1 | 2/2004 | Yuen et al. | |
| 6,732,369 | B1 | 5/2004 | Leftwich et al. | |
| 6,742,183 | B1 | 5/2004 | Reynolds et al. | |
| 6,745,391 | B1 | 6/2004 | Macrae et al. | |
| 6,756,997 | B1 | 6/2004 | Ward et al. | |
| 6,760,537 | B2 | 7/2004 | Mankovitz | |
| 6,799,326 | B2 | 9/2004 | Boylan et al. | |
| 6,799,327 | B1 | 9/2004 | Reynolds et al. | |
| 6,850,693 | B2 | 2/2005 | Young et al. | |
| 6,859,799 | B1 | 2/2005 | Yuen | |
| 7,039,935 | B2 | 5/2006 | Knudson et al. | |
| 7,069,576 | B1 | 6/2006 | Knudson et al. | |
| 7,487,529 | B1 | 2/2009 | Orlick | |
| 2001/0013126 | A1 * | 8/2001 | Lemmons et al. | 725/53 |
| 2001/0029610 | A1 | 10/2001 | Corvin et al. | |
| 2001/0047298 | A1 | 11/2001 | Moore et al. | |
| 2001/0054181 | A1 | 12/2001 | Corvin | |
| 2002/0073424 | A1 | 6/2002 | Ward et al. | |
| 2002/0124255 | A1 | 9/2002 | Reichardt et al. | |
| 2002/0184625 | A1 * | 12/2002 | Allport | 725/39 |
| 2003/0005445 | A1 | 1/2003 | Schein et al. | |
| 2003/0028889 | A1 * | 2/2003 | McCoskey et al. | 725/91 |
| 2003/0056219 | A1 | 3/2003 | Reichardt et al. | |
| 2003/0110495 | A1 | 6/2003 | Bennington et al. | |
| 2003/0110499 | A1 | 6/2003 | Knudson et al. | |
| 2003/0115599 | A1 | 6/2003 | Bennington et al. | |
| 2003/0115602 | A1 | 6/2003 | Knee et al. | |
| 2003/0163813 | A1 | 8/2003 | Klosterman et al. | |
| 2003/0164858 | A1 | 9/2003 | Klosterman et al. | |
| 2003/0177494 | A1 | 9/2003 | Satterfield et al. | |
| 2003/0188310 | A1 | 10/2003 | Klosterman et al. | |
| 2003/0188311 | A1 | 10/2003 | Yuen et al. | |
| 2003/0196201 | A1 | 10/2003 | Schein et al. | |
| 2003/0204847 | A1 | 10/2003 | Ellis et al. | |
| 2003/0208756 | A1 | 11/2003 | Macrae et al. | |
| 2004/0010806 | A1 | 1/2004 | Yuen et al. | |
| 2004/0045025 | A1 | 3/2004 | Ward et al. | |
| 2004/0107437 | A1 | 6/2004 | Reichardt et al. | |
| 2004/0117848 | A1 | 6/2004 | Karaoguz et al. | |
| 2004/0168189 | A1 | 8/2004 | Reynolds et al. | |
| 2004/0194138 | A1 | 9/2004 | Boylan et al. | |
| 2004/0261098 | A1 | 12/2004 | Macrae et al. | |
| 2005/0010949 | A1 | 1/2005 | Ward et al. | |
| 2005/0028201 | A1 | 2/2005 | Klosterman et al. | |
| 2005/0125823 | A1 | 6/2005 | McCoy et al. | |
| 2005/0149964 | A1 | 7/2005 | Thomas et al. | |
| 2005/0155056 | A1 | 7/2005 | Knee et al. | |
| 2005/0216936 | A1 | 9/2005 | Knudson et al. | |
| 2005/0251824 | A1 | 11/2005 | Thomas et al. | |
| 2006/0020973 | A1 * | 1/2006 | Hannum et al. | 725/46 |
| 2006/0156336 | A1 | 7/2006 | Knudson et al. | |
| 2006/0212894 | A1 | 9/2006 | Knudson et al. | |
| 2006/0277574 | A1 | 12/2006 | Schein et al. | |
| 2006/0288366 | A1 | 12/2006 | Boylan et al. | |
| 2007/0016926 | A1 | 1/2007 | Ward et al. | |
| 2007/0033613 | A1 | 2/2007 | Ward et al. | |
| 2007/0107010 | A1 | 5/2007 | Jolna et al. | |
| 2007/0118873 | A1 | 5/2007 | Houh et al. | |
| 2007/0186241 | A1 | 8/2007 | Sugimoto et al. | |
| 2007/0288959 | A1 | 12/2007 | Istvan et al. | |
| 2008/0276279 | A1 | 11/2008 | Gossweiler et al. | |
| 2009/0064228 | A1 | 3/2009 | Lin | |
| 2009/0320072 | A1 * | 12/2009 | McClanahan et al. | 725/47 |
| 2010/0299701 | A1 | 11/2010 | Liu et al. | |

* cited by examiner

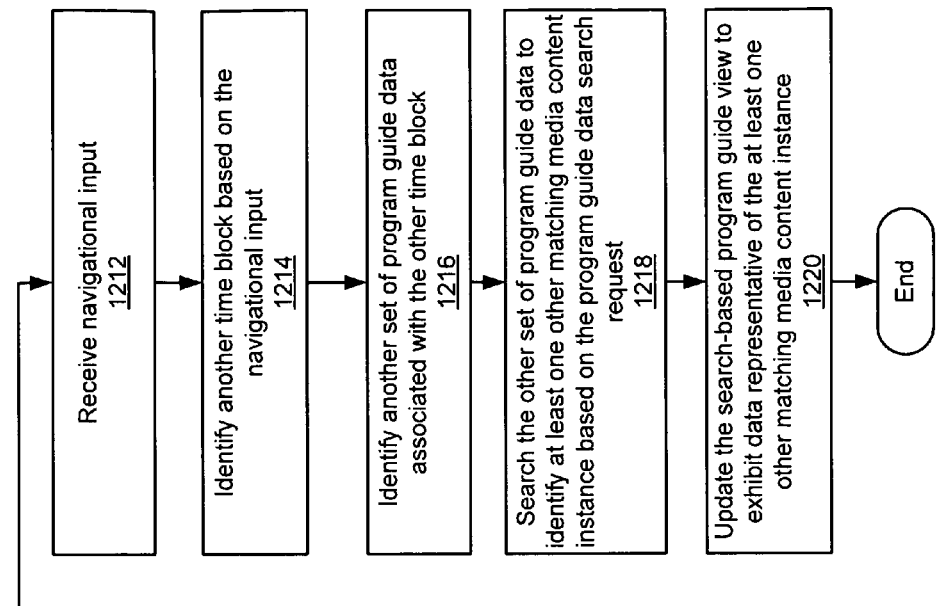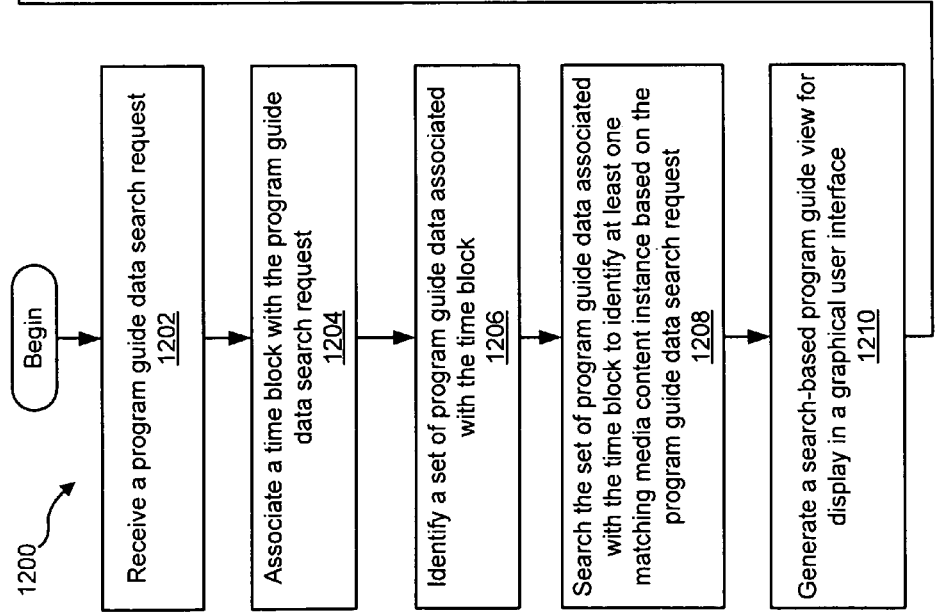
Fig. 12

SEARCH-BASED MEDIA PROGRAM GUIDE SYSTEMS AND METHODS

BACKGROUND INFORMATION

The set-top box has become an important computing device for accessing media content services and the media content within those services. A set-top box is usually configured to provide users with access to a large number and variety of media content choices offered by a provider. For example, a user may choose to experience a variety of broadcast television programs, pay-per-view services, video-on-demand programming, Internet services, and audio programming via a set-top box.

The large number of media content choices offered by a provider can make it difficult for a user of a set-top box to find and select desired media content. On-screen program guides have alleviated this problem to some degree. A user of a set-top box is able to navigate within a conventional program guide in search of a desired media channel or program. However, as media content providers have expanded and continue to expand the services and media content choices provided to users (e.g., more media content channels), conventional tools for navigating within program guides have become inefficient and less effective. For example, certain conventional program guide tools require repetitive user input, present information in unintuitive and/or overly inclusive ways, and/or are slow to process significant amounts of program guide data typically associated with large numbers of media content choices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 12 illustrates an exemplary search-based program guide method.

DETAILED DESCRIPTION OF PREFERRED EMBODIMENTS

Exemplary search-based media program guide systems and methods are disclosed herein. As described in more detail below, the exemplary search-based media program guide systems and methods disclosed herein may provide a user of a media content access subsystem and/or device (e.g., a set-top box) with one or more tools for searching for media content and/or viewing search results in one or more search-based program guide graphical user interface ("GUI") views. In certain embodiments, the exemplary systems and methods may efficiently search for media content based on one or more search requests and provide one or more search-based program guide views including data representative of media content matching the search request(s) for viewing by a user. In some examples, the exemplary systems and methods disclosed herein may provide one or more tools configured to facilitate user customization of one or more search-based program guide views.

As used herein, the terms "media content" and "media content instance" will be used herein to refer to any television program, on-demand media program, pay-per-view media program, broadcast media program, multicast media program, narrowcast media program, IPTV media content, recorded content (e.g., DVR content), advertisement (e.g., commercial), video, movie, song, video game, image, photograph, sound, or any segment, component, or combination of these or other forms of media content that may be viewed or otherwise experienced by a user. Exemplary search-based media program guide systems and methods will now be described in more detail with reference to the accompanying drawings.

Figure 1:
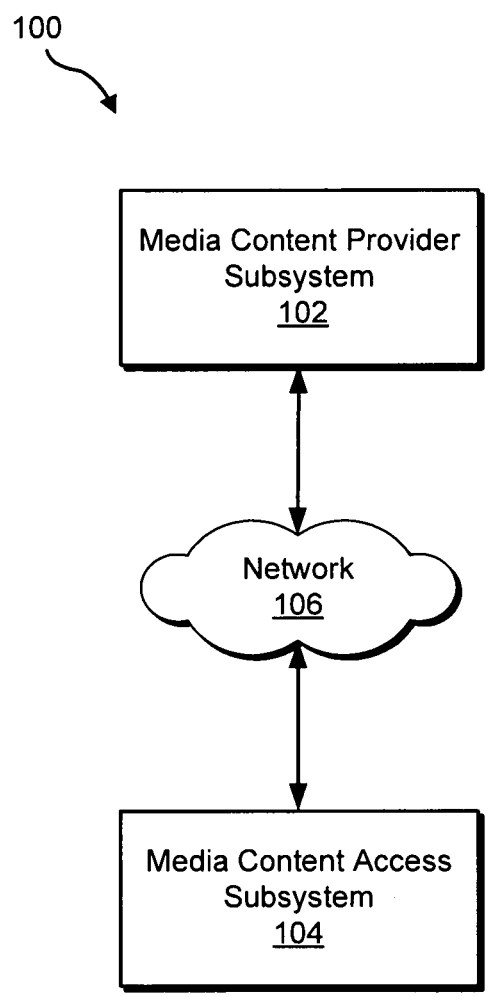
FIG. 1 illustrates an exemplary media content delivery system.

FIG. 1 illustrates an exemplary media content delivery system 100 (or simply "system 100"). As shown in FIG. 1, system 100 may include a media content provider subsystem 102 (or simply "provider subsystem 102") communicatively coupled to a media content access subsystem 104 (or simply "access subsystem 104"). Access subsystem 104 may be configured to communicate with and receive a signal and/or data stream containing data representative of media content and/or data associated with media content (e.g., metadata, program guide data, etc.) from provider subsystem 102. Access subsystem 104 and provider subsystem 102 may communicate using any suitable communication technologies, devices, networks, media, and protocols supportive of remote data communications.

For example, as shown in FIG. 1, provider subsystem 102 may be configured to communicate with access subsystem 104 over a network 106 (and communications links thereto). Network 106 may include one or more networks or types of networks capable of carrying communications and/or data signals between provider subsystem 102 and access subsystem 104. For example, network 106 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 102 and access subsystem 104 may communicate over network 106 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 1 shows provider subsystem 102 and access subsystem 104 communicatively coupled via network 106, it will be recognized that provider subsystem 102 and access subsystem 104 may be configured to communicate with one another in any other suitable manner (e.g., via a direct connection).

Components of system 100 may include any computer hardware and/or computer-implemented instructions (e.g., software), or combinations of computer-implemented instructions and hardware, configured to perform one or more of the processes described herein. In particular, one or more components of system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

In some examples, provider subsystem 102 may be configured to generate or otherwise provide media content (e.g., in the form of one or more media content streams) to access subsystem 104. Access subsystem 104 may be configured to facilitate access by a user to media content received from provider subsystem 102. To this end, access subsystem 104 may present the media content for experiencing (e.g., viewing) by a user, record the media content, parse metadata and/or other data associated with the media content, etc. Presentation of the media content may include, but is not limited to, displaying, playing, or otherwise presenting the media content, or one or more components of the media content, such that the media content may be experienced by the user.

Figure 2:
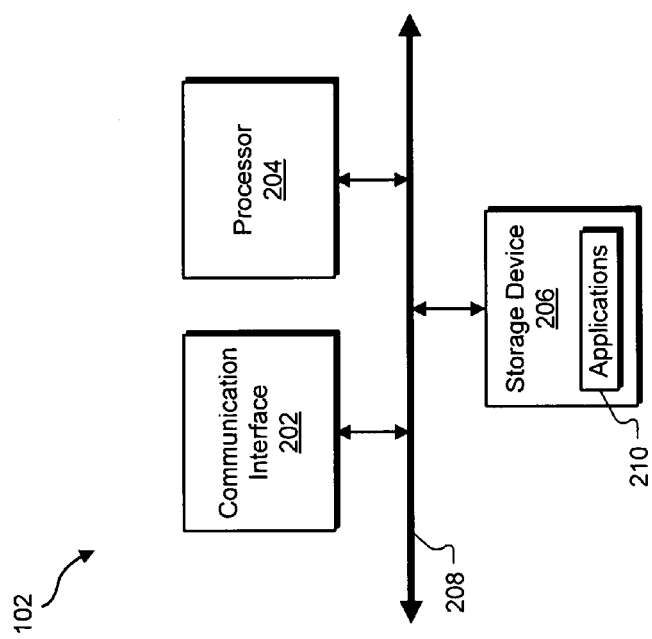
FIG. 2 illustrates exemplary components of a media content provider subsystem.

FIG. 2 illustrates exemplary components of provider subsystem 102. As shown in FIG. 2, provider subsystem 102 may include a communication interface 202, a processor 204, and a storage device 206 communicatively coupled one to another via a communication infrastructure 208. The components of provider subsystem 102 may communicate with one another, including sending data to and receiving data from one another, using any suitable communication technologies. Moreover, the components of provider subsystem 102 may be implemented on any computing device or combination of computing devices, such as one or more servers, personal computers, or the like.

While an exemplary provider subsystem 102 is shown in FIG. 2, the components illustrated in FIG. 2 are not intended to be limiting. Additional or alternative components may be used in other embodiments. Components of the provider subsystem 102 shown in FIG. 2 will now be described in additional detail.

Communication interface 202 may be configured to communicate with one or more computing devices, including access subsystem 104. In particular, communication interface 202 may be configured to transmit and/or receive communication signals, media content, and/or data (e.g., program guide data) to/from access subsystem 104. Examples of communication interface 202 may include, without limitation, a wired network interface (such as a network interface card), a wireless network interface (such as a wireless network interface card), a modem, and any other suitable interface. In at least one embodiment, communication interface 202 may provide a direct connection between provider subsystem 102 and access subsystem 104 via a direct link to a network, such as the Internet or a subscriber television network. Communication interface 202 may additionally or alternatively provide such a connection through, for example, a local area network (such as an Ethernet network), a personal area network, a telephone or cable network, a cellular telephone connection, a satellite data connection, or any other suitable connection.

In some examples, communication interface 202 may be configured to transmit (e.g., broadcast, multicast, and/or narrowcast) data representative of one or more media content instances to access subsystem 104. Such data may be transmitted in one or more media content data streams, as one or more data files, or in any other suitable manner as may serve a particular application. Communication interface 202 may be configured to interface with any suitable communication media, protocols, and formats, including any of those mentioned above.

Processor 204 generally represents any type or form of processing unit capable of processing data or interpreting, executing, and/or directing execution of one or more of the instructions, processes, and/or operations described herein. Processor 204 may direct execution of operations in accordance with one or more applications 210 or other computer-executable instructions such as may be stored in storage device 206 or another computer-readable medium. As an example, processor 204 may be configured to process data, including modulating, encoding, and/or otherwise preparing data (e.g., media content data) for transmission by communication interface 202.

Storage device 206 may include one or more data storage media, devices, or configurations and may employ any type, form, and combination of data storage media and/or device. For example, storage device 206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 206. For example, data representative of one or more executable applications 210 configured to direct processor 204 to perform any of the content provider operations described herein may be stored within storage device 206. In some examples, data may be arranged in one or more databases residing within storage device 206.

Figure 3:
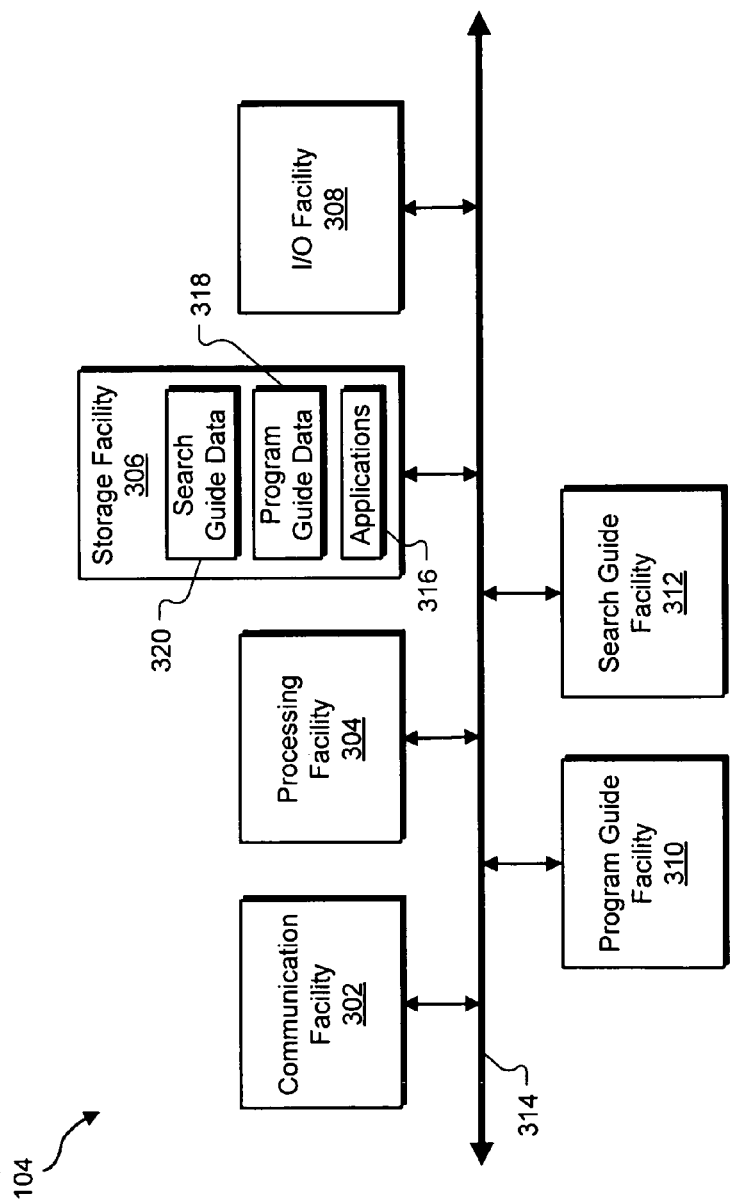
FIG. 3 illustrates exemplary components of a media content access subsystem.

FIG. 3 illustrates exemplary components of access subsystem 104. As shown in FIG. 3, access subsystem 104 may include a communication facility 302, a processing facility 304, a storage facility 306, an input/output ("I/O") facility 308, a program guide facility 310, and a search guide facility 312 communicatively coupled one to another via a communication infrastructure 314. The components of access subsystem 104 may communicate with one another, including sending data to and receiving data from one another, using any suitable communication technologies. Moreover, the components of access subsystem 104 may be implemented on any computing device or combination of computing devices, such as a set-top box, a communications device, a mobile device (e.g., a mobile phone device), a handheld device, a personal computer, a phone device (e.g., Verizon Hub device), a personal-digital assistant device, gaming device, digital video recording ("DVR") device (e.g., a personal video recording ("PVR") device), a television device, and/or any media content access device configured to perform one or more of the processes and/or operations described herein.

While an exemplary access subsystem 104 is shown in FIG. 3, the components illustrated in FIG. 3 are not intended to be limiting. Additional or alternative components may be used in other embodiments. Components of the access subsystem 202 shown in FIG. 3 will now be described in additional detail.

Communication facility 302 may be configured to communicate with one or more computing devices, including provider subsystem 102. In particular, communication facility 302 may be configured to transmit and/or receive communication signals, media content, and/or data to/from provider subsystem 102. Examples of communication facility 302 may include, without limitation, a wired network interface (such as a network interface card), a wireless network interface (such as a wireless network interface card), a modem, and any other suitable interface. In at least one embodiment, communication facility 302 may provide a direct connection between provider subsystem 102 and access subsystem 104 via a direct link to a network, such as the Internet or a subscriber television network. Communication facility 302 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 102 may transmit (e.g., broadcast, multicast, and/or narrowcast) data representative of one or more media content instances. Communication facility 302 may be configured to receive such data such that the data may be processed by access subsystem 104. To this end, communication facility 302 may include any device, logic, and/or other technologies suitable for receiving signals, data streams, and/or data representative of media content. Communication facility 302 may be configured to interface with any suitable communication media, protocols, and formats, including any of those mentioned above.

In certain embodiments, provider subsystem 102 may be configured to transmit and access subsystem 104 may be configured to receive data streams or signals including data representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 104. The term "media content carrier channel" or "media content channel" as used herein may refer generally to any carrier of media content, including, but not limited to, media (e.g., television) channels, streams, addresses, frequencies or other carriers of media content.

Communication facility 302 may be configured to selectively identify, receive, and/or process appropriate data streams and/or media content instances at the scheduled transmission times and on the appropriate media content carrier channels. For instance, in certain implementations communication facility 302 may include a tuner configured to selectively receive media content carried on a particular media content carrier channel. The tuner may be tuned to a particular media content carrier channel such that the media content carried on the media content carrier channel is received and may be processed by access subsystem 104.

In some examples, communication facility 302 may include multiple tuners such that media content carried on different media content carrier channels may be concurrently received for processing by the access subsystem 104. For example, communication facility 302 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 102, additionally or alternatively, communication facility 302 may be configured to receive other types of signals (e.g., other types of media content carrying signals) from provider subsystem 102 and/or one or more other sources without using a tuner. For example, provider subsystem 102 may transmit digital streams of data packets (e.g., Internet Protocol ("IP") based data packets) that can be received without using a tuner. For such types of signals, communication facility 302 may receive and forward the signals directly to other components of access subsystem 104 without the signals going through a tuner. For an IP-based signal, for example, communication facility 302 may function as an IP receiver.

Processing facility 304 generally represents any type or form of processing unit capable of processing data or interpreting, executing, and/or directing execution of one or more of the instructions, processes, and/or operations described herein. Processing facility 304 may direct execution of operations in accordance with one or more executable applications 316 or other computer-executable instructions such as may be stored in storage facility 306 or another computer-readable medium. As an example, processing facility 304 may be configured to process data, including demodulating, decoding, and/or parsing data (e.g., data representative of media content received from provider subsystem 102 by communication facility 302), and encoding and modulating data for transmission by communication facility 302.

Storage facility 306 may include one or more data storage media, devices, or configurations and may employ any type, form, and combination of data storage media and/or device. For example, storage facility 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including any other data described herein, may be temporarily and/or permanently stored in storage facility 306. For example, data representative of one or more executable applications 316 configured to direct processing facility 304 to perform any of the operations described herein may be stored within storage facility 306. In addition, program guide data 318 and search guide data 320 may be stored in storage facility 306. Program guide data 318 and search guide data 320 will be described in more detail further below. In some examples, data may be arranged in one or more databases residing within storage facility 306.

I/O facility 308 may be configured to receive user input and provide user output and may include any hardware, firmware, software, or combination thereof supportive of input and output capabilities. For example, I/O facility 308 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O facility 308 may be configured to generate and provide graphical data to a display for presentation to a user. The graphical data may represent of one or more graphical user interfaces ("GUIs"), GUI views, media content views, program guide views, search-based program guide views, and/or any other view as may serve a particular application.

Program guide facility 310 may be configured to maintain and operate on program guide data 318. As mentioned above, media content instances may be transmitted by provider subsystem 102 at scheduled transmission times and on certain media content carrier channels. To assist access subsystem 104 and/or a user of access subsystem 104 with reception of media content instances at appropriate scheduled transmission times and on appropriate media content carrier channels, program guide data 318 may be received by communication facility 302 from provider subsystem 102 and/or from another source. The program guide data 318 may be stored in storage facility 306 as shown in FIG. 3.

The program guide data 318 may include information descriptive of a media content transmission schedule, including information descriptive of media content carrier channels, scheduled transmission times (e.g., programming time slots), media content instances, metadata for the media content instances, and relationships between the media content channels, transmission times, and media content instances. In certain embodiments, the program guide data 318 received and stored by access subsystem 104 may be descriptive of a media content transmission schedule covering a certain period of time (e.g., a twenty-four hour period, a week, two weeks, or a month). Accordingly, access subsystem 104 may be configured to periodically receive at least one update to the program guide data 318 (i.e., updated program guide data) that is descriptive of a transmission schedule for a new period of time. For example, access subsystem 104 may be configured to receive updated program guide data on a daily basis (e.g., at a certain off-peak time each night) and to update program guide data 318 stored in storage facility 306 with the updated program guide data.

Program guide facility 310 may be configured to arrange and provide graphical data representative of a program guide view to I/O facility 308 for inclusion in a GUI. I/O facility 308 may generate and provide a GUI including the program guide view to a display for presentation to a user. A program guide view may include a graphical arrangement of program guide data 318, one or more program guide tools (e.g., program guide navigation tools), one or more graphical selectors for navigating and highlighting selectable options, and/or other graphics. Typically, a program guide view presents at least a portion of a media content transmission schedule to a user. The user may utilize the program guide view to access information about media content instances and scheduled transmission times and channels associated with the media content instances.

Search guide facility 312 may be configured to receive data representative of search requests (e.g., from I/O facility 340) and search program guide data 318 based on the search requests to identify matching media content (e.g., one or media content instances that match the search requests). In addition, search guide facility 312 may be configured to arrange and provide graphical data representative of a search-based program guide view to I/O facility 308 for inclusion in a GUI. I/O facility 308 may generate and provide a GUI including the search-based program guide view to a display for presentation to a user. A search-based program guide view may include a graphical arrangement of one or more select subsets of program guide data 318 identified as matching one or more search requests. Exemplary search-based program guide operations and views will be described in detail further below.

Figure 4:
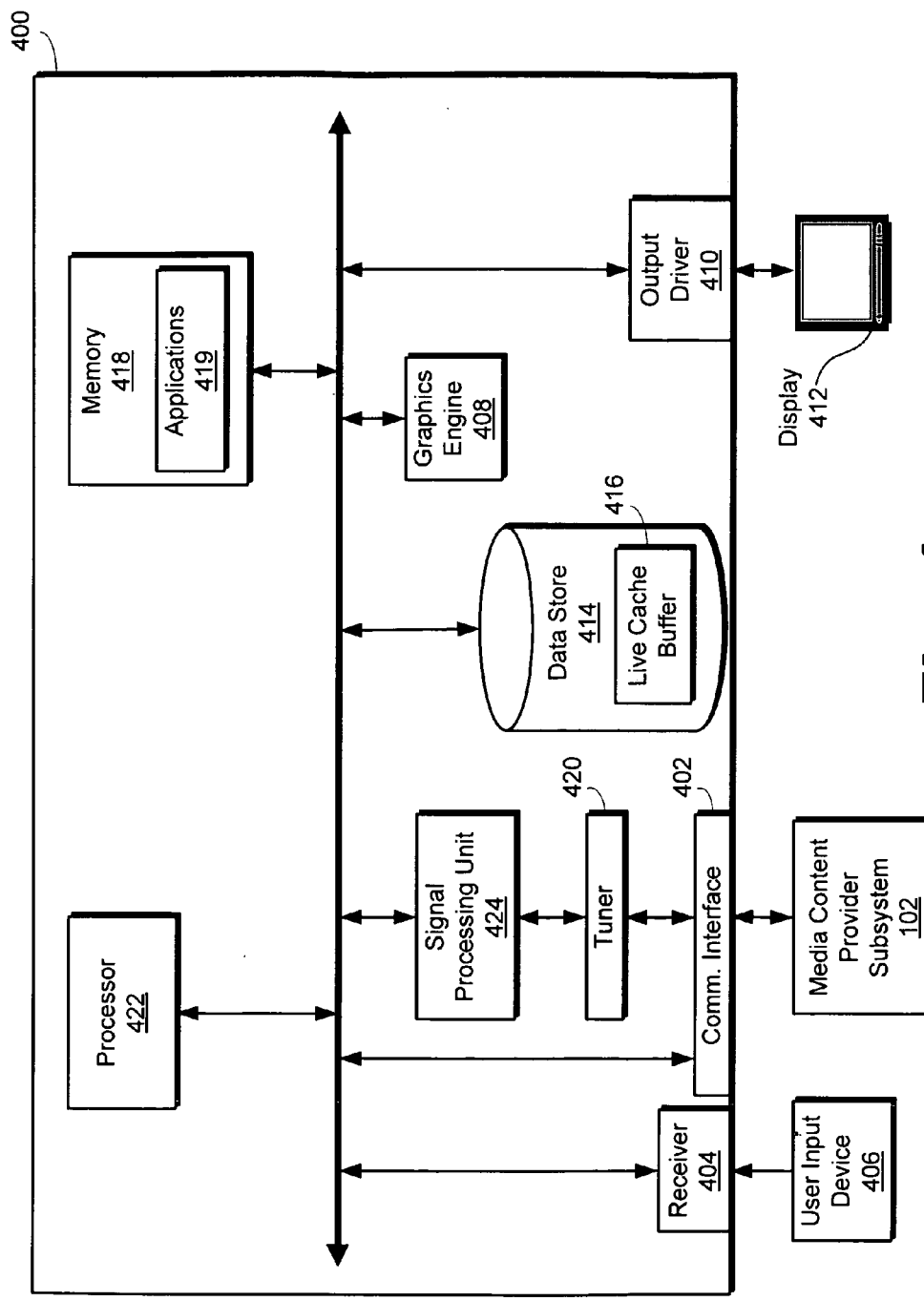
FIG. 4 illustrates an exemplary media content access device having the media content access subsystem of FIG. 3 implemented thereon.

Access subsystem 104 and/or components of access subsystem 104 may be implemented as may suit a particular application. FIG. 4 illustrates an exemplary media content access device 400 having access subsystem 104 implemented thereon. Device 400 may include one or more of the components of access subsystem 104 shown in FIG. 3 and may be configured to perform one or more of the processes and/or operations described herein. Device 400 may include, but is not limited to, a set-top box, a media content processing device, a communications device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein.

As shown in FIG. 4, device 400 may include a communication interface 402 configured to receive media content and/or data (e.g., metadata, program guide data, and/or any other data associated with media content) in any acceptable format from provider subsystem 102 or from any other suitable external source. Communication interface 402 may include any device, logic, and/or other technologies suitable for receiving signals and/or data representative of media content, program guide data, and/or other types of media content or data. Communication interface 402 may be configured to interface with any suitable communication media, protocols, and formats, including any of those mentioned above.

Device 400 may also include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Figure 5:
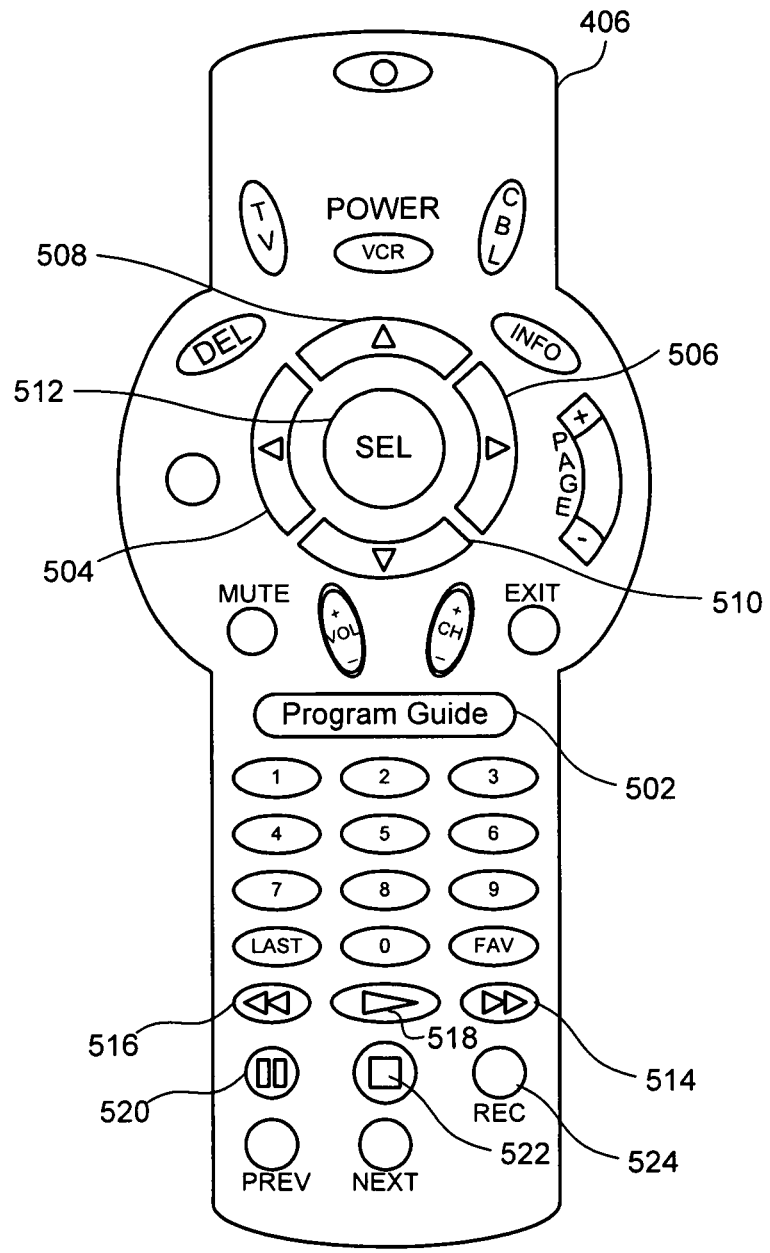
FIG. 5 illustrates an exemplary remote control user input device.

FIG. 5 illustrates an exemplary remote control user input device 406. In some examples, input device 406 may be configured to facilitate user control of operations of access subsystem 104. For instance, a program guide button 502 may be configured to evoke a presentation of a program guide GUI view on a display. A left button 504, a right button 506, an up button 508, a down button 510, and a select button 512 may be included and configured to facilitate a user evoking and/or navigating through various views, options, and GUIs displayed by a display. A fast forward or skip button 514, a reverse or rewind button 516, a play button 518, a pause button 520, a stop button 522, and/or a record button 524 may also be included and configured to facilitate a user navigating through, recording, and/or otherwise interacting with one or more media content instances. Although not specifically shown in FIG. 5, in certain examples input device 406 may include a dedicated menu button configured to evoke a presentation of a menu guide GUI view on a display. Input device 406 shown in FIG. 5 is merely illustrative of one of the many different types of user input devices that may be used to provide input commands to access subsystem 104.

Returning to FIG. 4, device 400 may include a graphics engine 408 and an output driver 410. Graphics engine 408 may be configured to generate graphics to be provided to output driver 410, which may be configured to interface with or drive a display 412. Output driver 410 may provide output signals to display 412, the output signals including graphical content (e.g., media content and/or program guide content) generated by graphics engine 408 and to be presented by display 412 for experiencing by a user. For example, output driver 410 may provide a data representative of a GUI including a program guide view to display 412 for presentation to the user. Graphics engine 408 and output driver 410 may include any combination of hardware, software, and/or firmware as may serve a particular application.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Media content and/or data associated with media content (e.g., program guide data 318 and/or search guide data 320) may be temporarily and/or permanently stored in data store 414.

Data store 414 is shown to be included within device 400 in FIG. 4 for illustrative purposes only. It will be understood that data store 414 may additionally or alternatively be located external to device 400.

Data store 414 may include one or more live cache buffers 416. Live cache buffer 416 may additionally or alternatively reside in memory 418 or in a storage device external to device 400. In some examples, media content data may be temporarily stored in live cache buffer 416 to facilitate viewing and/or recording of the media content.

Device 400 may include memory 418. Memory 418 may include, but is not limited to, FLASH memory, random access memory ("RAM"), dynamic RAM ("DRAM"), other suitable computer-readable media, or any combination or subcombination thereof. In some examples, one or more applications 419 configured to run on or otherwise be executed by device 400 may reside in memory 418. Applications 419 may be configured to direct device 400, or one or more components of device 400, to perform one or more of the operations described herein. In certain examples, program guide facility 310 and/or search guide facility 312 may be implemented, at least in part, as one or more applications 419 stored in memory 418 or other computer-readable medium accessible by device 400.

Device 400 may include one or more tuners 420. Tuner 420 may be configured to selectively receive media content carried on a particular media content carrier channel such that the media content may be processed by device 400. In some examples, media content received by tuner 420 may be temporarily buffered, or stored, in the live cache buffer 416. If there are multiple tuners 420, there may be a live cache buffer 416 corresponding to each of the tuners 420.

While tuner 420 may be used to receive certain media content-carrying signals transmitted by provider subsystem 102, device 400 may be configured to receive other types of media content signals (including media content signals and/or program guide data signals) from provider subsystem 102 and/or one or more other sources without using a tuner. For example, provider subsystem 102 may transmit digital streams of data packets (e.g., Internet Protocol ("IP") based data packets) that can be received without using a tuner. For such types of media content signals, communication interface 402 may receive and forward the signals directly to other components of device 400 (e.g., processor 422 or signal processing unit 424, described in more detail below) without the signals going through tuner 420. For an IP-based signal, for example, signal processing unit 424 may function as an IP receiver.

Device 400 may include at least one processor, such as processor 422, configured to control and/or perform one or more operations of device 400. Device 400 may also include a signal processing unit 424 configured to process incoming media content. Signal processing unit 424 may be configured, for example, to demodulate and parse encoded digital media content. In some examples, device 400 may include one or more signal processing units 424 corresponding to each of the tuners 420.

Figure 6:
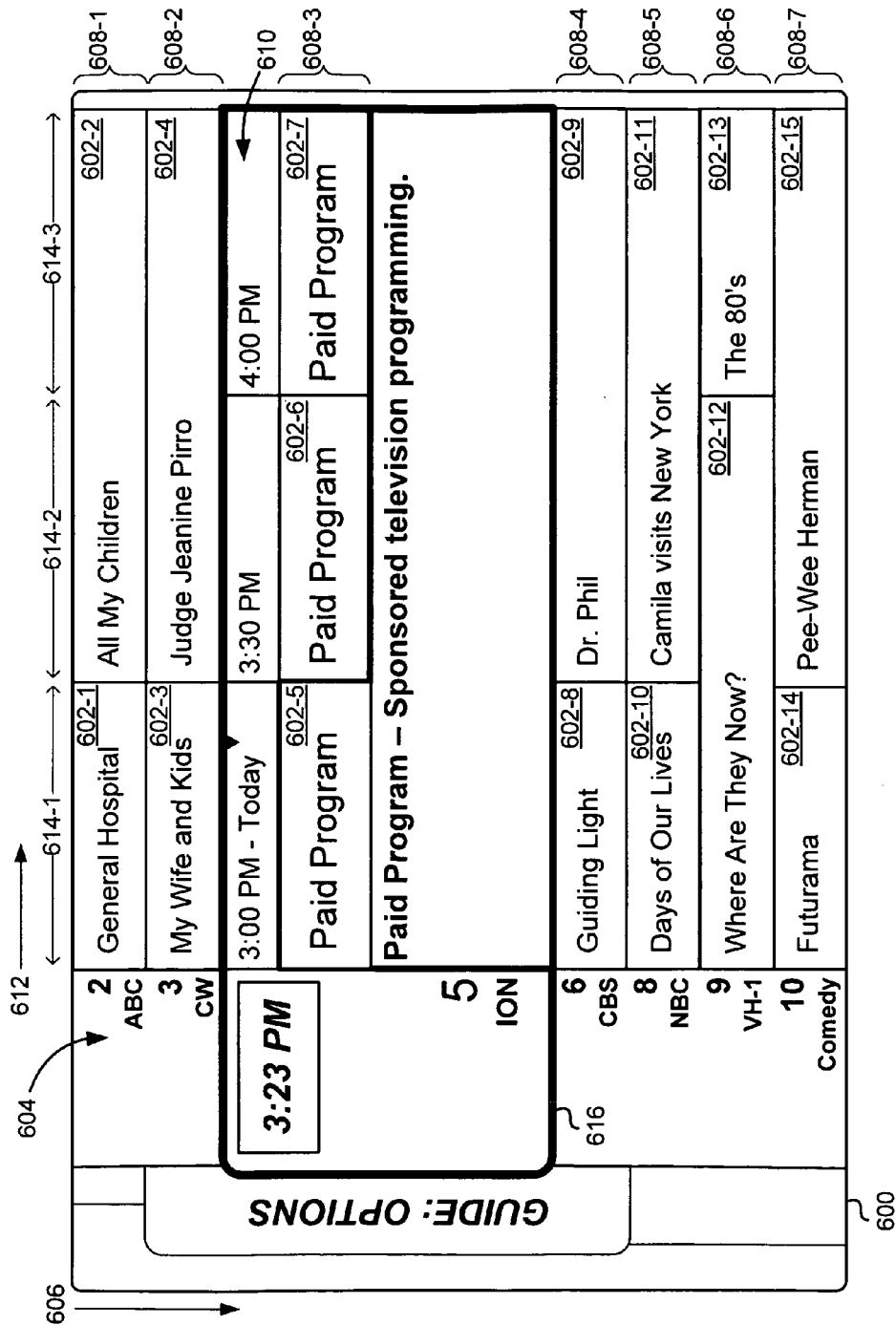
FIG. 6 illustrates an exemplary program guide view displayed in a graphical user interface.

As mentioned, access subsystem 104 may be configured to provide a program guide view including a graphical arrangement of program guide data 318, one or more program guide tools (e.g., program guide navigation tools), and one or more graphical selectors for navigating between and highlighting selectable options. FIG. 6 illustrates an exemplary program guide view 600 that may be generated and provided by access subsystem 104 for display in a GUI.

As shown in FIG. 6, program guide view 600 may include a plurality of cells 602 (e.g., cells 602-1 through 602-15) associated with data representative of respective media content instances and related metadata and programming information. For example, cell 602-1 may be associated with a particular television program titled "General Hospital" and program guide data associated with the television program.

Cells 602 may be arranged in program guide view 600 based on one or more attributes of cells 602 and/or the corresponding media content instances. For example, cells 602 may be arranged in program guide view 600 based on media content carrier channels associated with the media content instances and time slots representing time periods during which the media content instances are scheduled for transmission.

To this end, program guide view 600 may include graphical data representative of a plurality of media content carrier channels arranged along a channel axis. As shown in FIG. 6, data representative of a list 604 of media content carrier channels may be aligned vertically along a channel axis 606, forming a plurality of horizontal channel rows 608 (e.g., channel rows 608-1 through 608-7), with each media content carrier channel corresponding to one of the horizontal channel rows 608. For example, a media content carrier channel labeled "2 ABC" corresponds to channel row 608-1 in FIG. 6.

Similarly, program guide view 600 may include a plurality of programming time slots arranged along a time axis. As shown in FIG. 6, data representative of a list 610 of programming time slots may be aligned horizontally along a time axis 612 to form a plurality of vertical time slot columns 614 (e.g., time slot columns 614-1 through 614-3), with each programming time slot corresponding to one of the vertical time slot columns 614. For example, a programming time slot representative of a thirty-minute time period from 3:00 PM to 3:30 PM corresponds to time slot column 614-1 in FIG. 6.

Positions of cells 602 relative to channel rows 608 and time slot columns 614 in program guide view 600 may represent relationships between the media content instances associated with the cells 602 and media content carrier channels and programming time slots associated with the media content instances. For example, the position of cell 602-1 in program guide view 600 may represent that a media content instance (e.g., a television program titled "General Hospital") associated with cell 602-1 is scheduled for transmission on the media content carrier channel labeled "2 ABC" and during the programming time slot from 3:00 PM to 3:30 PM.

Program guide view 600 may further include a graphical selector 616 which may be positioned within program guide view 600 to indicate a selected cell 602. In FIG. 6, selector 616 indicates a selection of cell 602-5. A user of access subsystem 104 may provide input to move selector 616. In response, access subsystem 104 may update program guide view 600 to show selector 616 positioned at another cell 602 and/or to show graphical data representative of a different set of program guide data. In this manner, a user of access subsystem 104 may navigate within program guide view 600 to locate desired media content instances and corresponding transmission information.

The program guide view 600 shown in FIG. 6 is illustrative only. Typically, program guide data 318 may represent numerous media content instances, media content carrier channels, and programming time slots. To illustrate, program guide data 318 may represent a transmission schedule for hundreds of channels and for any suitable period of time, including one day, two weeks, or a month of programming, for example. Accordingly, the program guide view 600 may represent only a small portion of the program guide data 318 maintained by access subsystem 104.

As an alternative to moving selector 616 to navigate within program guide view 600, a user of access subsystem 104 may want to search for and locate desired media content in a more efficient and/or convenient manner. To this end, access subsystem 104 may be configured to provide one or more program guide search tools and search-based program guide views to a user. Exemplary program guide search tools and search-based program guide views that may be generated and provided by access subsystem 104 for display will now be described.

Figure 7:
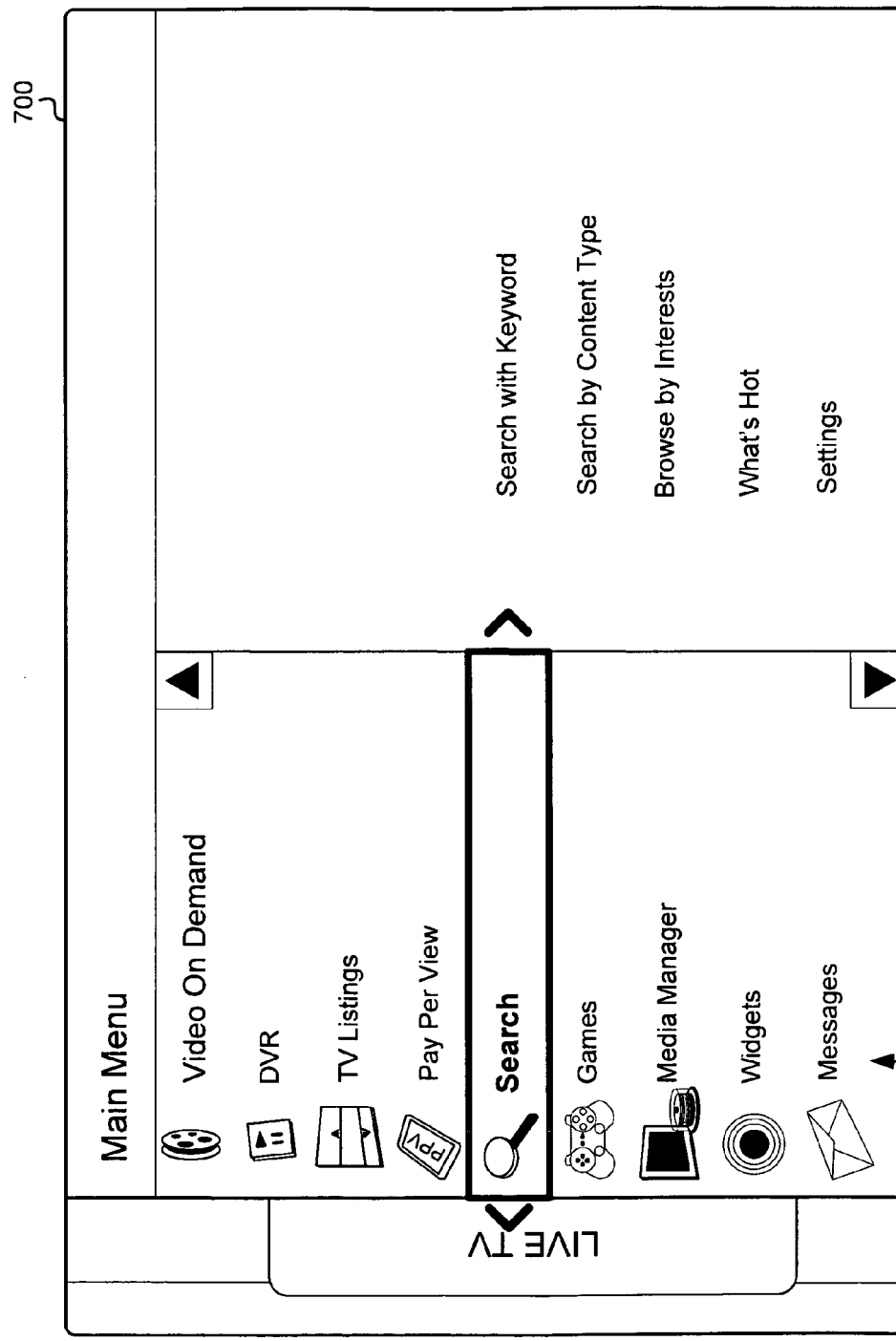
FIG. 7 illustrates an exemplary main menu view displayed in a graphical user interface.

FIG. 7 illustrates an exemplary main menu view 700, which may include one or more menu options 702. As shown, one of the menu options 702 may include a "search" menu option. In response to a user selection of the "search" menu option, access subsystem 104 may provide a search menu view for display.

Figure 8:
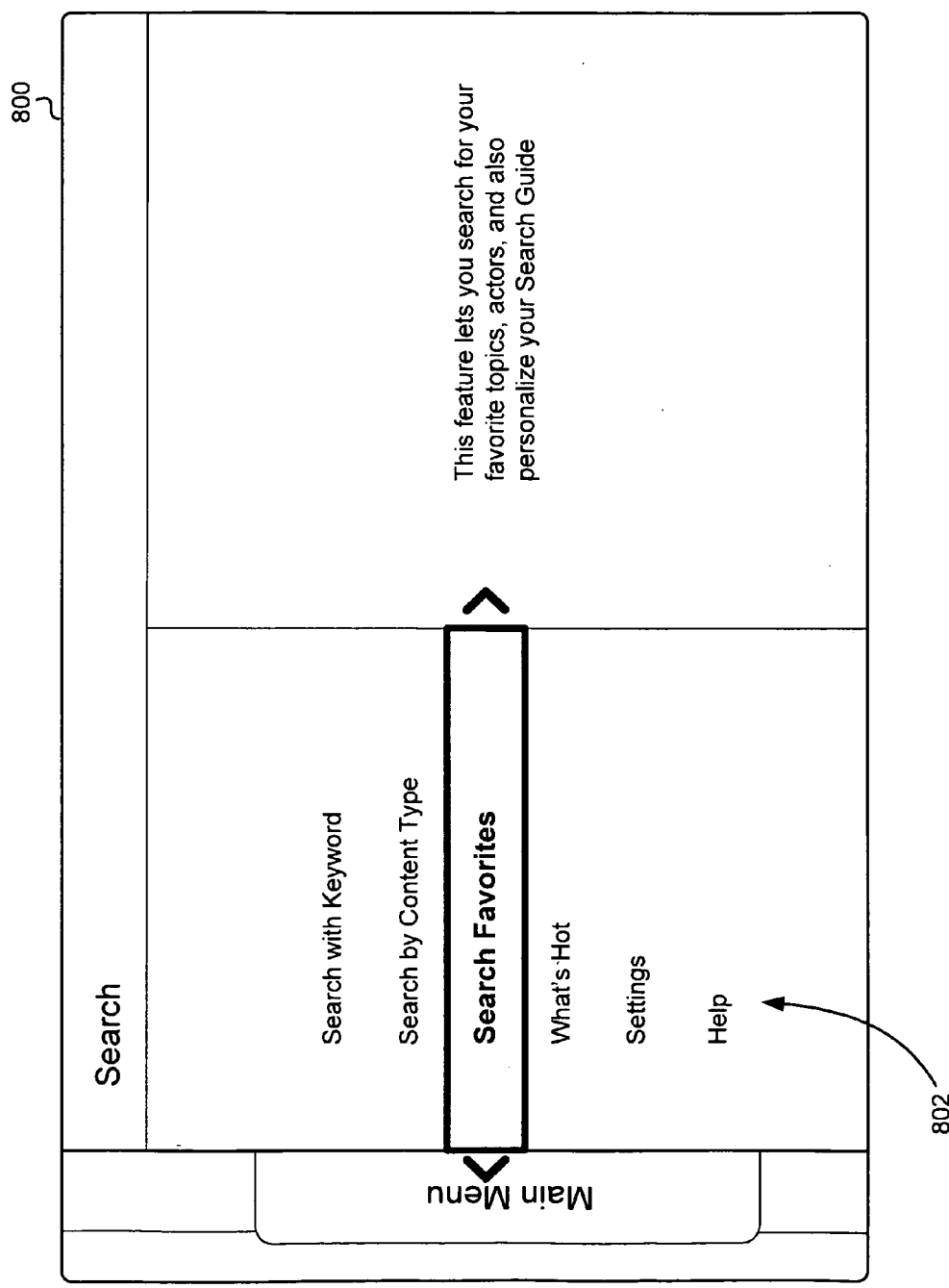
FIG. 8 illustrates an exemplary search menu view displayed in a graphical user interface.

FIG. 8 illustrates an exemplary search menu view 800, which may include one or more search options 802. As shown, the search options 802 may include a "search with keyword" option, "search by content type" option, and a "search favorites" option. In response to a user selection of the "search with keyword" option or the "search favorites" option, access subsystem 104 may provide a keyword search tool for display.

Figure 9:
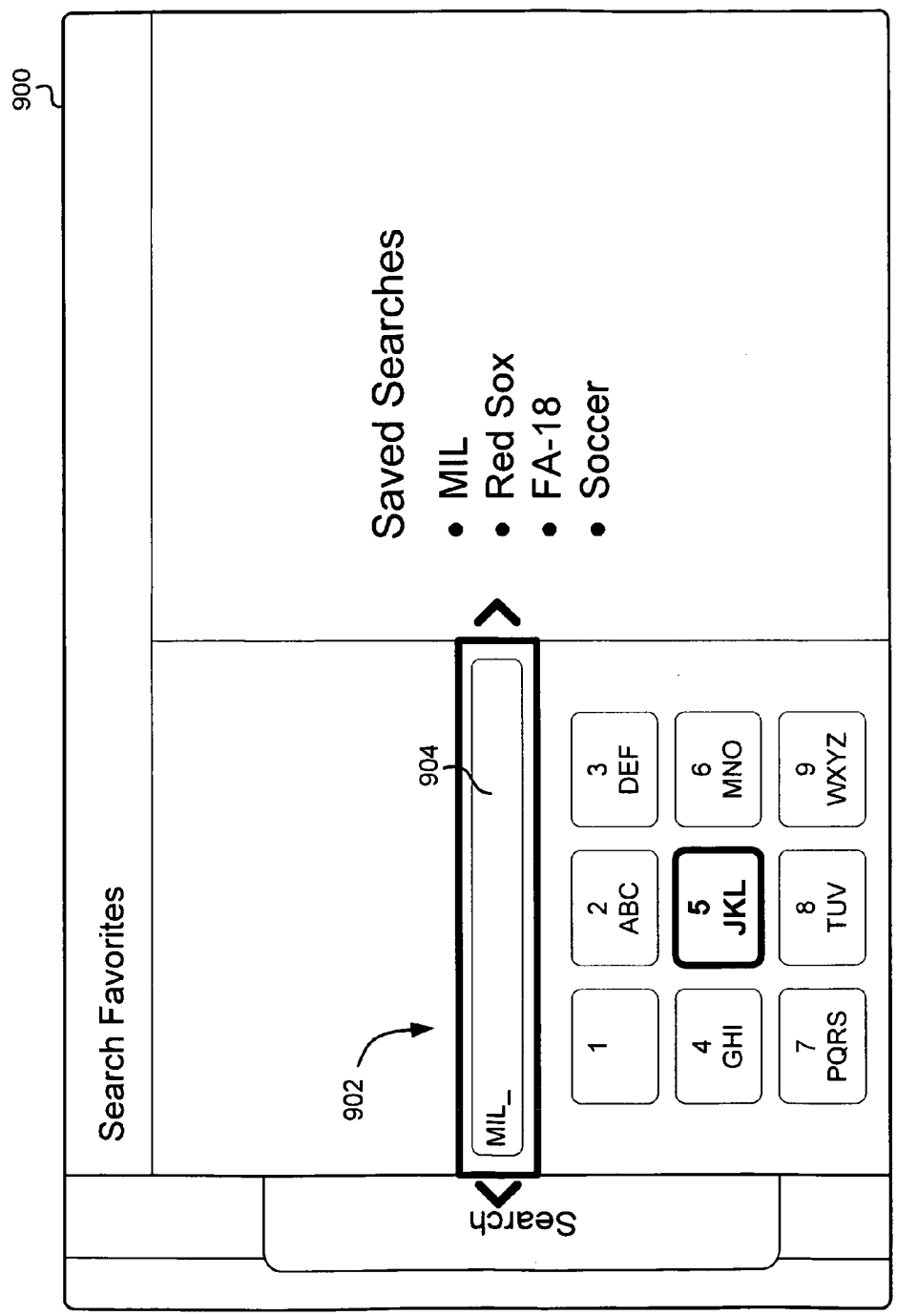
FIG. 9 illustrates an exemplary search tool view displayed in a graphical user interface.

FIG. 9 illustrates an exemplary search tool view 900, which may include a keyword search tool 902 configured to facilitate receipt of user input indicative of a program guide data search request. In the illustrated example, keyword search tool 902 may include an input field 904 into which a user of access subsystem 104 may input one or more keyword search terms. As shown, user input such as "MIL" may be displayed in the input field 904 of keyword search tool 902. Keyword search tool 902 is illustrative only. Keyword search terms may be input by a user and received by access subsystem 104 in any suitable way.

Moreover, while several examples described herein are directed to searching program guide data 318 for keyword search terms, this is illustrative only and not limiting in any sense. A program guide data search request may be associated with any suitable search criterion or criteria. For example, alternative or in addition to one or more keyword search terms, search criteria may include data representative of media content recommendations, scheduled media content recordings, content types (e.g., standard definition or high definition content), and any other criteria that may be used to search program guide data 318.

A user may utilize keyword search tool 902 of FIG. 9 to initiate a request to search program guide data 318 based on one or more keyword search terms entered into input field 904. Access subsystem 104 may receive a program guide data search request and search program guide data 318 based on data associated with the search request (e.g., user input such as one or more keyword search terms such as "MIL"). Access subsystem 104 may perform the search in any suitable way. For example, search guide facility 312 may search program guide data 318 (e.g., media content metadata within the program guide data 318) to identify one or more media content instances that match a search request. To illustrate, when a search request is for a keyword term "MIL," access subsystem 104 may search program guide data 318 to identify data that includes "MIL." Based on such data matches, search guide facility 312 may identify one or more media content instances that are deemed to match a search request. Such data matches and corresponding matching media content instances may be referred to as "search results."

Figure 10:
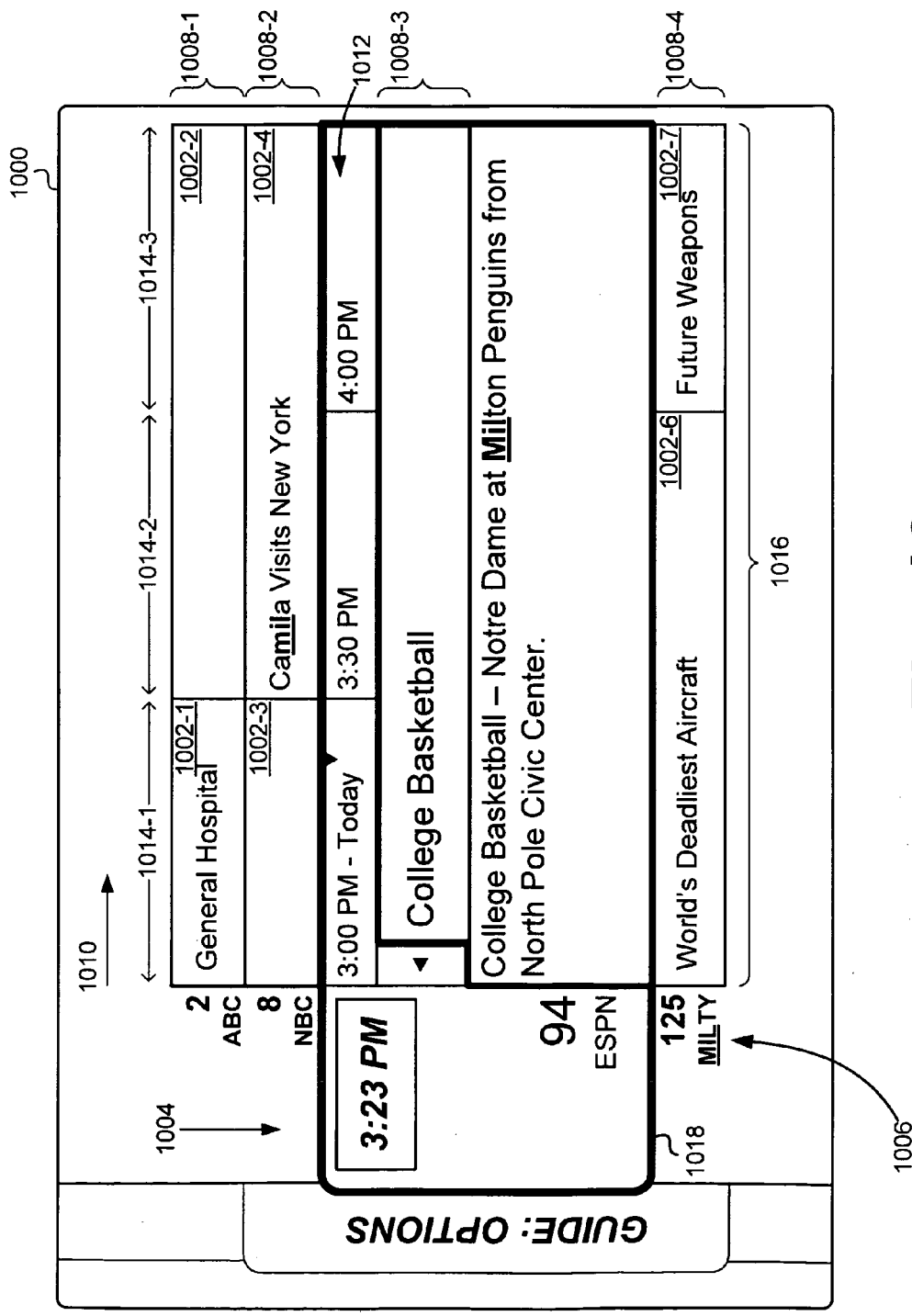
FIG. 10 illustrates an exemplary search-based program guide view displayed in a graphical user interface.

Access subsystem 104 may be configured to provide graphical data representative of program guide search results for display in one or more search-based program guide views. For example, FIG. 10 illustrates an exemplary search-based program guide view 1000 that may be provided by access subsystem 104 for display in a GUI. Search-based program guide view 1000 may be provided for display in response to a program guide data search request, such as a keyword-based search request for program guide data 318 associated with the keyword search term "MIL" as described above.

As shown in FIG. 10, search-based program guide view 1000 may include graphical data representative of one or more media content instances matching the keyword search term "MIL." In the illustrated example, the graphical data representative of the matching media content instances may include textual data representing titles (e.g., "General Hospital," "Camila Visits New York," etc.) of the matching media content instances.

The media content instances may be determined to match the keyword search term when metadata associated with the media content instances includes the keyword search term, as described above. In certain examples, matching metadata may be found in the title of a media content instance, such as the keyword search term "MIL" being found in the title "Camila Visits New York," for instance. In other examples, matching metadata may be found in one or more metadata fields other than the title of a media content instance. For example, a media content instance titled "General Hospital"

may be determined to match a search request because a metadata field other than the title filed includes the keyword search term "MIL."

As shown in FIG. 10, search-based program guide view 1000 may include graphical representations of a plurality of cells 1002 (e.g., cells 1002-1 through 1002-7). Data representative of one or more media content instances identified as matching a program guide data search request may be positioned within one or more of the cells 1002 in search-based program guide view 1000. For example, cell 1002-1 may be associated with and include data representative of a matching television program titled "General Hospital."

The cells 1002 may be arranged in search-based program guide view 1000 based on one or more attributes of the cells 1002 and/or corresponding matching media content instances. For example, the cells 1002 may be arranged in search-based program guide view 1000 based on media content carrier channels associated with the matching media content instances and programming time slots representing time periods during which the matching media content instances are scheduled for transmission.

To this end, search-based program guide view 1000 may include graphical data representative of a plurality of media content carrier channels arranged along a channel axis 1004. As shown in FIG. 10, data representative of a list 1006 of media content carrier channels may be aligned vertically along channel axis 1004, forming a plurality of horizontal channel rows 1008 (e.g., channel rows 1008-1 through 1008-4), with each media content carrier channel corresponding to one of the horizontal channel rows 1008. For example, a media content carrier channel labeled "2 ABC" corresponds to channel row 1008-1 in FIG. 10.

In certain embodiments, the list 1006 of media content carrier channels includes only media content carrier channels associated with media content instances within a particular programming time block (e.g., such as time block 1016 described further below) and identified as matches to a program guide data search request. In the example illustrated in FIG. 10, search-based program guide view 1000 includes data representative of four media content carrier channels (e.g., media content carrier channels labeled "2 ABC," "8 NBC," "94 ESPN," and "125 MILTY") associated with matching media content instances and forming four channel rows 1008-1 through 1008-4 within search-based program guide view 1000.

Other media content carrier channels not associated with a matching media content instance may be omitted from the list 1006 of media content carrier channels in search-based program guide view 1000. An omission of a media content carrier channel not associated with a matching media content instance from search-based program guide view 1000 may be accomplished by filtering the media content carrier channel out of data representative of search-based program guide view 1000 and/or program guide view 600. For example, a media content carrier channel labeled "3 CW" in program guide view 600 may be filtered out of search-based program guide view 1000 when not associated with a matching media content instance.

In addition, search-based program guide view 1000 may include graphical data representative of a plurality of programming time slots arranged along a time axis 1010. As shown in FIG. 10, data representative of a list 1012 of programming time slots may be aligned horizontally along time axis 1010 to form a plurality of vertical time slot columns 1014 (e.g., time slot columns 1014-1 through 1014-3), with each programming time slot corresponding to one of the vertical time slot columns 1014. For example, a programming time slot representative of a thirty-minute time period from 3:00 PM to 3:30 PM corresponds to time slot column 1014-1 in FIG. 10.

Time axis 1010 may include data representative of or otherwise associated with a time block spanning one or more programming time slots. In search-based program guide view 1000, such a time block comprises a ninety-minute time block including three thirty-minute time slots spanning a time period between 3:00 PM and 4:30 PM. This time block, which corresponds to a period of time graphically indicated in search-based program guide view 1000, may be referred to as a display time block 1016 as depicted in FIG. 10.

In certain embodiments, display time block 1016 may span only a portion of the period of time covered by program guide data 318. As mentioned above, for example, program guide data 318 may be descriptive of a media content transmission schedule covering a certain period of time (e.g., a twenty-four hour period, a week, two weeks, or a month). Accordingly, display time block 1016 spanning programming time slots 1014 displayed in search-based program guide view 1000 may span only a portion of the overall time period covered by program guide data 318. The display time block 1016 shown in FIG. 10 is illustrative only. Other display time blocks covering other periods of time may be used as may suit a particular application, resolution, and/or display.

Positions of cells 1002 relative to channel rows 1008 and time slot columns 1014 in search-based program guide view 1000 may represent relationships between the matching media content instances associated with the cells 1002 and media content carrier channels and programming time slots associated with the matching media content instances. For example, the position of cell 1002-1 in search-based program guide view 1000 may represent that a media content instance (e.g., a television program titled "General Hospital") associated with cell 1002-1 is scheduled for transmission on the media content carrier channel labeled "2 ABC" and during the programming time slot from 3:00 PM to 3:30 PM.

Hence, in certain embodiments, the plurality of cells 1002 included in search-based program guide view 1000 may be arranged to form a two-dimensional grid of cells 1002 having two axes—channel axis 1004 and time axis 1012. Positions of the cells 1002 within the grid may represent relationships between matching media content instances associated with the cells 1002 and media content carrier channels and programming time slots positioned along channel axis 1004 and time axis 1012, respectively.

In certain embodiments, access subsystem 104 may leverage one or more attributes of a full (e.g., unsearched) program guide view such as program guide view 600 of FIG. 6 to generate search-based program guide view 1000 of FIG. 10. For example, search-based program guide view 1000 may comprise a filtered view of program guide view 600 shown in FIG. 6. For instance, access subsystem 104 may filter data representative of one or more media content channels included in program guide view 600 and not associated with media content instances identified as matching a search request (e.g., media content carrier channels labeled "3 CW," "5 ION," "6 CBS," "9 VH-1," and "10 Comedy" in FIG. 6) from program guide view 600 when generating search-based program guide view 1000. One or more remaining (i.e., unfiltered) media content carrier channels may be repositioned when generating search-based program guide view 1000. For example, media content carrier channel labeled "8 NBC" in FIG. 6 may be moved vertically upward along channel axis 606 to fill in an empty channel row 608 from which another media content carrier channel has been removed. One or more additional media content carrier channels may be added when generating search-based program guide view 1000. For example, media content carrier channels labeled "94 ESPN" and "125 MILTY" in FIG. 10 may be added to fill in an empty channel rows 608 from which other media content carrier channels have been removed. In this or similar manner, access subsystem 104 may remove, reposition, and/or add data to convert program guide view 600 of FIG. 6 to search-based program guide view 1000 of FIG. 10.

Additionally or alternatively, access subsystem 104 may filter data representative of non-matching media content instances out of program guide view 600 on a cell-by-cell basis when generating search-based program guide view 1000. For example, a particular media content carrier channel may be associated with at least one matching media content instance. Accordingly, data representative of the media content channel may be included in search-based program guide view 1000. However, another media content instance associated with the media content carrier channel may not match the search request. Access subsystem 104 may filter data representative of the non-matching media content instance out of its respective cell in search-based program guide view 1000. As an example, FIG. 10 illustrates cells 1002-2 and 1002-3 as empty placeholder cells from which data representative of non-matching media content instances is omitted (e.g., filtered). Such empty placeholder cells 1002 may be included in search-based program guide view 1000 and may help maintain spatial relationships within the grid of cells 1002 in search-based program guide view 1000.

Search-based program guide view 1000 may further include a graphical selector 1018 which may be positioned within search-based program guide view 1000 to indicate a selected cell 1002. In FIG. 10, selector 1018 indicates a selection of cell 1002-5. A user of access subsystem 104 may provide input to move selector 1018. In response, access subsystem 104 may update search-based program guide view 1000 to show selector 1018 positioned at another cell 1002 and/or to show graphical data representative of another set of program guide data. In this manner, a user of access subsystem 104 may navigate within search-based program guide view 1000 to locate desired matching media content instances and corresponding transmission information.

As an example, a user of access subsystem 104 may provide navigational input to cause access subsystem 104 to move selector 1018 from cell to cell in search-based program guide view 1000. The navigational input may be provided by the user in any suitable manner, including by the user utilizing input device 406. For example, the user may actuate right button 506 of input device 406 when viewing search-based program guide view 1000 of FIG. 10. In response, access subsystem 104 may scroll search-based program guide view 1000 in a corresponding direction such that search-based program guide view 1000 is updated to include another set of program guide data matching the search request. In particular, access subsystem 104 may scroll search-based program guide view 1000 along time axis 1010 to transition from one time block to another time block such that another set of matching program guide data associated with another display time block is included in search-based program guide view 1000.

Figure 11:
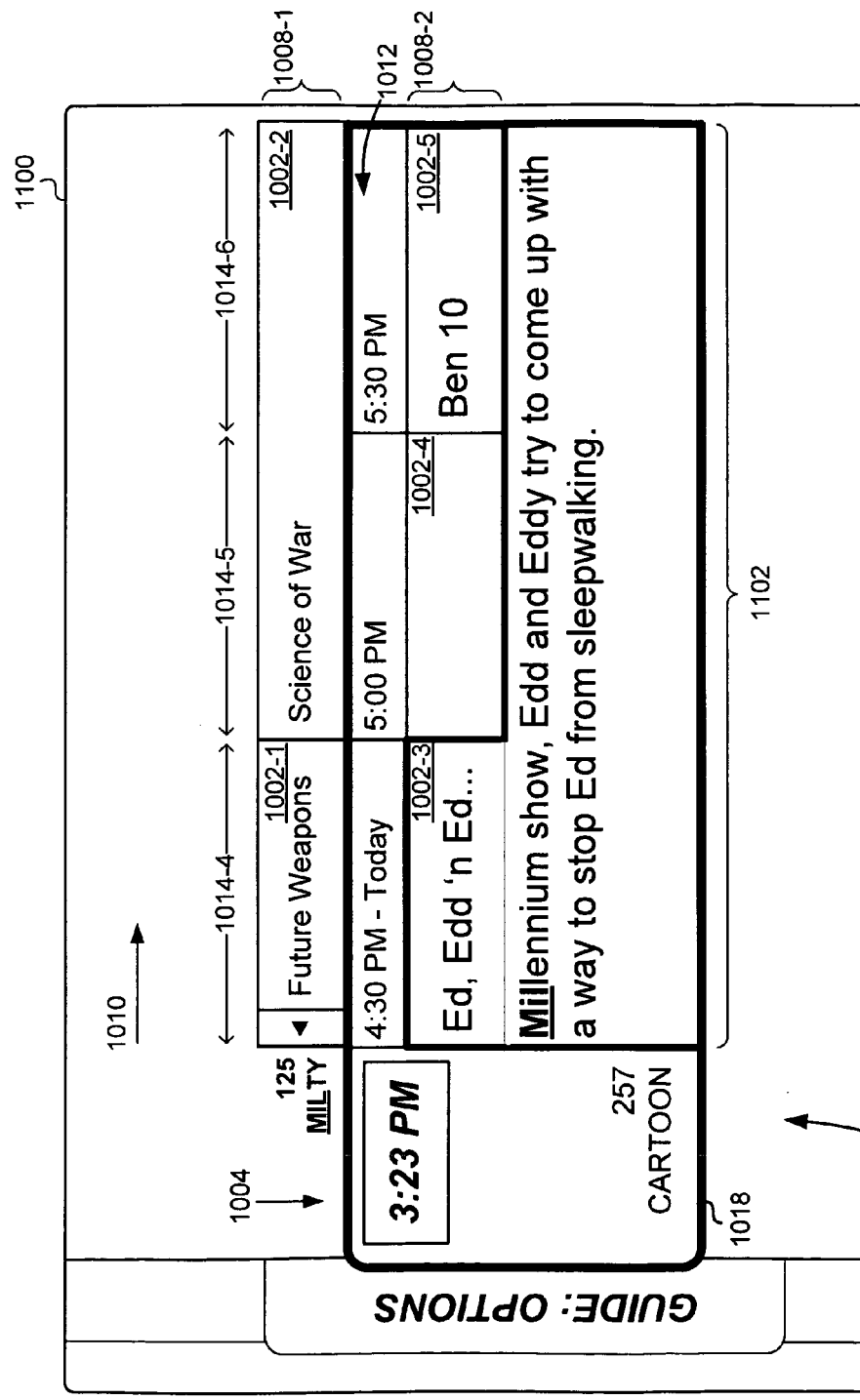
FIG. 11 illustrates another exemplary search-based program guide view displayed in a graphical user interface.

To illustrate, FIG. 11 shows another exemplary search-based program guide view 1100. In certain embodiments, search-based program guide view 1100 may be generated and provided by access subsystem 104 for display in response to a search request associated with another display time block 1102 indicated in FIG. 11. In certain embodiments, search-based program guide view 1100 may comprise an updated view of search-based program guide view 1000 that may be provided for display when a user of access subsystem 104 viewing search-based program guide view 1000 provides navigational input to cause another display time block 1102 to be associated with search-based program guide view 1000, thereby creating search-based program guide view 1100. Such an update may be performed in response to a user of access subsystem 104 providing navigational input to cause selector 1018 to be moved to the right along time axis 1010.

As shown in FIG. 11, graphical data representative of or otherwise associated with another display time block 1102 is displayed in search-based program guide view 1100. In the illustrated example, the other display time block 1102 comprises a ninety-minute time period including three thirty-minute programming time slots 1014-4, 1014-5, and 1014-6 spanning a time period from 4:30 PM to 6:00 PM. Hence, display time block 1016 of search-based program guide view 1000 has become or been replaced with display time block 1102 of search-based program guide view 1100 in FIG. 11. This update from display time block 1016 shown in FIG. 10 to display time block 1102 shown in FIG. 11 may be accomplished in any suitable way, including by scrolling search-based program guide view 1000 along time axis 1010 such that the end time (e.g., 4:30 PM) of display time block 1016 shown in FIG. 10 becomes the start time of the display time block 1102 shown in FIG. 11.

One or more other features of search-based program guide view 1000 of FIG. 10 may be updated to produce search-based program guide view 1100 of FIG. 11. The updates may be based on the new display time block 1102 shown in FIG. 11. As an example, data representative of matching media content instances may be updated in search-based program guide view 1100. In particular, data representative of matching media content instances associated with the new display time block 1102 may be displayed in search-based program guide view 1100. In FIG. 11, data representative of matching television programs titled "Future Weapons," "Science of War," "Ed, Edd, 'n Eddy," and "Ben 10" is displayed. Updates may also include omitting data representative of matching media content instances associated with the previous display time block 1016 from search-based program guide view 1100. For example, data representative of matching television programs titled "General Hospital," "Camila Visits New York," "College Basketball," "World's Deadliest Aircraft," and "Future Weapons" included in search-based program guide view 1000 of FIG. 10 is omitted from search-based program guide view 1100 of FIG. 11.

In addition, the updates may include omission, repositioning, and/or addition of data representative of one or more media content carrier channels. For instance, the updates may include omission of data representative of one or more media content carrier channels included in search-based program guide view 1000 from search-based program guide view 1100. Media content carrier channels labeled "2 ABC," "8 NBC," and "94 ESPN" in search-based program guide view 1000 of FIG. 10 are omitted from search-based program guide view 1100 of FIG. 11, for example. Accordingly, graphical data representative of another set of media content carrier channels is presented in search-based program guide view 1100. In the example illustrated in FIG. 11, data representative of media content carrier channels labeled "125 MILTY" and "257 CARTOON" is displayed.

In this or similar manner, access subsystem 104 may update graphical data included in search-based program guide view 1000 to produce another search-based program guide view 1100. The updates may be performed dynamically in response to user input such as navigational input causing movement of selector 1018 relative to cells 1002 within a search-based program guide grid. Accordingly, a user may navigate within a search-based program guide grid, and access subsystem 104 may dynamically update search-based program guide views based on changes to search results that may occur due to changes to a time block and/or a set of media content carrier channels.

In certain embodiments, search guide facility 312 may be configured to limit searches of program guide data 318 to one or more subsets of the program guide data 318. This may help promote quick and efficient search operations, especially where large amounts of program guide data 318 are maintained by access subsystem 104. In certain embodiments, for example, search guide facility 312 may restrict a search of program guide data 318 to data that is associated with a select time block, such as a display time block associated with a display of a program guide view and/or search-based program guide view. For instance, a search of program guide data 318 may be restricted to data associated with display time block 1016 of FIG. 10 or display time block 1102 of FIG. 11. In certain embodiments, when the time block to which a search is restricted subsequently changes (e.g., in response to user input), access subsystem 104 may automatically identify another time block and perform another search that is restricted to program guide data associated with the other time block.

To help illustrate, FIG. 12 shows an exemplary search-based program guide method 1200. While FIG. 12 illustrates exemplary steps according to one embodiment, other embodiments may omit, add to, reorder, and/or modify any of the steps shown in FIG. 12. In certain embodiments, one or more of the exemplary steps of method 1200 may be performed by access subsystem 104.

In step 1202, a program guide data search request is received. For example, access subsystem 104 may receive data representative of a program guide data search request from a user of access subsystem 104, as described above.

In step 1204, a time block is associated with the program guide data search request. For example, access subsystem 104 may identify and associate a time block with the program guide data search request. Access subsystem 104 may identify the time block in any suitable way, such as in accordance with a predefined time block identification heuristic maintained by search guide facility 312. In certain embodiments, for example, access subsystem 104 may be configured to automatically identify the time block based on a time period associated with a search-based program guide GUI view. To illustrate, a program guide data search request may be received by access subsystem 104 at 3:23 PM. Access subsystem 104 may identify 3:23 PM as the time of receipt of the search request. Access subsystem 104 may then determine that the time of receipt falls within a particular programming time slot. For example, a programming time slot spanning a time period from 3:00 PM to 3:30 PM may be identified. Access subsystem 104 may identify a predetermined length of time associated with a display time block of a search-based program guide GUI view and use the predetermined length of time to identify any other programming time slots that may be included within the search-based program guide GUI view based on the time of receipt of the search request. For example, in addition to the programming time slot spanning a time period from 3:00 PM to 3:30 PM, access subsystem 104 may identify programming time slots spanning a time period from 3:30 PM to 4:30 PM. The identified time slots spanning a time period from 3:00 PM to 4:30 PM may make up the time block that access subsystem 104 associates with the search request in step 1204. Accordingly, the identified time block may correspond to a display time block such as display time block 1016 shown in FIG. 10.

In step 1206, a set of program guide data associated with the time block is identified. For example, access subsystem 104 may identify a set of program guide data associated with the time block. For example, one or more media content instances and related program guide data associated with programming time slots within the time block may be identified. In certain embodiments, the identified set of program guide may include a subset of the program guide data 318 maintained by access subsystem 104. Accordingly, a search of programming guide data 318 may be restricted to a subset of the program guide data 318 associated with the identified time block.

In step 1208, the set of program guide data associated with the time block is searched to identify at least one matching media content instance based on the program guide data search request. For example, access subsystem 104 may search the set of program guide data identified in step 1206 to identify at least one media content instance that matches the program guide data search request received in step 1202.

In step 1210, a search-based program guide view is generated for display in a graphical user interface. For example, access subsystem 104 may generate and provide data representative of a search-based program guide view for display. In certain embodiments, the search-based program guide view may comprise or be similar to search-based program guide view 1000 shown in FIG. 10.

In step 1212, navigational input is received. For example, access subsystem 104 may receive data representative of navigational input from input device 406 in response to a user of input device 406 actuating one or more navigational buttons (e.g., right button 506).

In step 1214, another time block is identified based on the navigational input. For example, access subsystem 104 may identify another time block based on the navigational input. In certain examples, the other time block may be identified by offsetting a currently selected time block, such as the time block identified and associated with the program guide data search request in step 1204, based on the navigation input. For example, access subsystem 104 may be configured to offset the currently selected time block by the length of time of the time block (e.g., by adding ninety minutes to the current time block) to identify the other time block. To illustrate, a currently selected time block spanning ninety minutes from 3:00 PM to 4:30 PM may be offset by ninety minutes to identify another ninety-minute time block from 4:30 PM to 6:00 PM. This illustrative only. The other time block may be identified in any suitable way based on the navigational input.

In step 1216, another set of program guide data associated with the other time block is identified. For example, access subsystem 104 may identify another set of program guide data associated with the other time block. The other set of program guide data may include one or more media content instances and related program guide data associated with programming time slots within the other time block identified in step 1214. The other set of program guide may include another subset of the program guide data 318 maintained by access subsystem 104. Accordingly, a search of programming guide data 318 may be restricted to a different subset of the program guide data 318 associated with the other time block.

In step 1218, the other set of program guide data is searched to identify at least one other matching media content instance based on the program guide data search request. For example, access subsystem 104 may search the other set of program guide data identified in step 1216 to identify at least one other media content instance that matches the program guide data search request received in step 1202.

In step 1220, the search-based program guide view is updated to exhibit data representative of the at least one other matching media content instance. For example, access subsystem 104 may update data representative of the search-based program guide view generated in step 1210 such that the search-based program guide view exhibits data representative of the at least one other matching media content instance. The updating may be performed in any suitable way and may include any of the exemplary updates described above in relation to transitioning from search-based program guide view 1000 of FIG. 10 to search-based program guide view 1100 of FIG. 11.

For example, the updates may reflect a transition from one time block to another time block and a change in matching media content instances associated with the time block transition, including removal of graphical data representative of matching media content instances associated with the first time block and addition of graphical data representative of matching media content instances associated with the other time block. In certain examples, the updates may include replacement of a media content channel with another media content channel within a channel row of search-based program guide view 1000. For example, the media content carrier channel labeled "2 ABC" in FIG. 10 may be replaced with the media content carrier channel labeled "125 MILTY" within channel row 1008-1 as shown in FIG. 11.

In certain embodiments, access subsystem 104 may be configured to generate a virtual search channel associated with a program guide data search request and provide graphical data representative of the virtual search channel for display in a search-based program guide view. The graphical data representative of the virtual search channel may include graphical data representative of one or more media content instances determined to match the program guide data search request.

Figure 13:
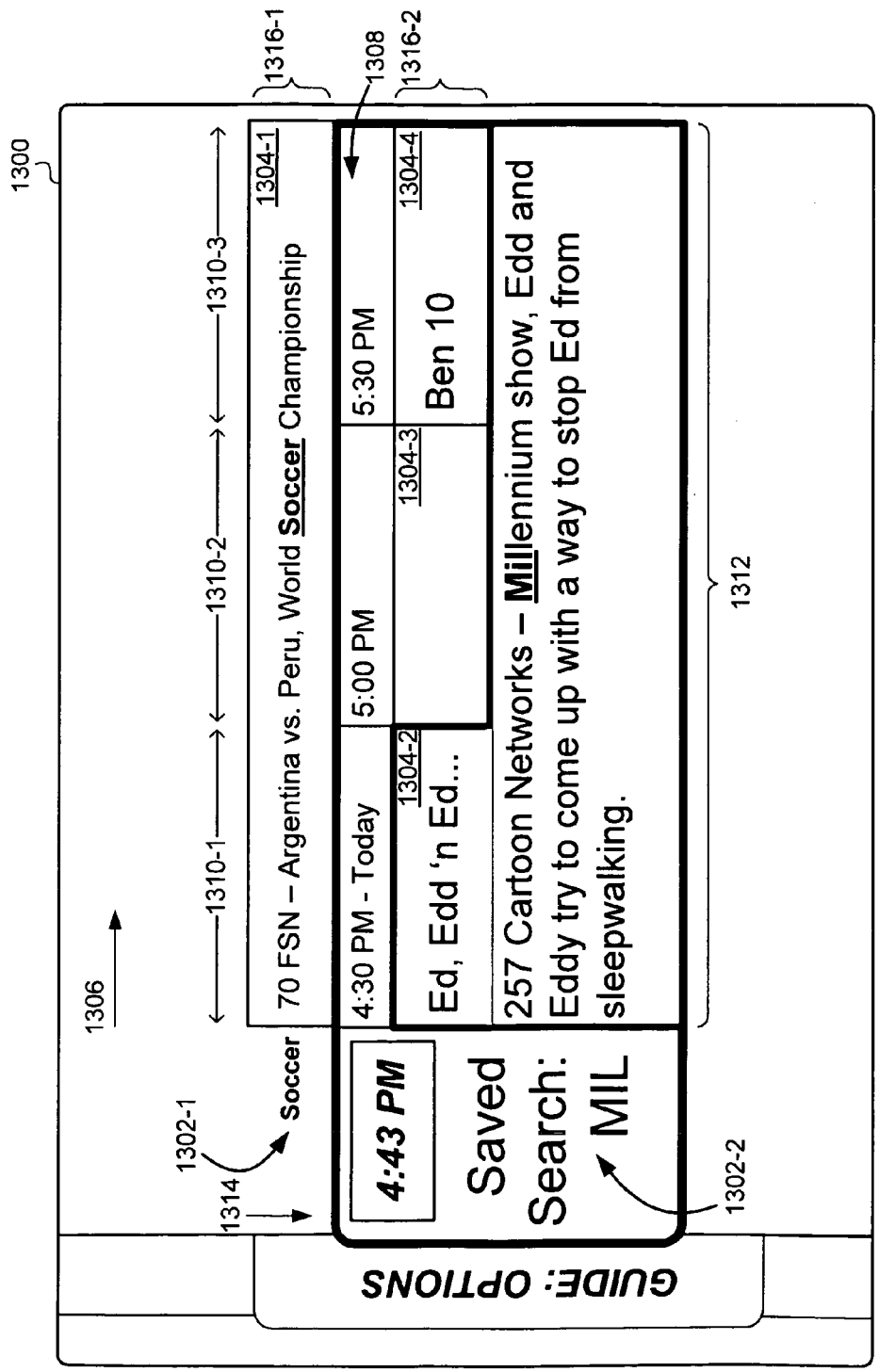
FIG. 13 illustrates another exemplary search-based program guide view displayed in a graphical user interface.

To illustrate, FIG. 13 shows another exemplary search-based program guide view 1300 that may be generated and provided for display by access subsystem 104. As shown, search-based program guide view 1300 may include graphical data representative of one or more virtual search channels 1302 (e.g., virtual search channels 1302-1 and 1302-2) associated with one or more program guide data search requests. In the illustrated example, search-based program guide view 1300 includes a first virtual search channel 1302-1 associated with a first program guide data search request (e.g., a search for the keyword search term "Soccer") and a second virtual search channel 1302-2 associated with a second program guide data search request (e.g., a search for the keyword search term "MIL"). In FIG. 13, the virtual search channels 1302 are represented by graphical data indicating the keyword search terms (e.g., "Soccer" and "MIL") of the program guide data search requests associated with the virtual search channels 1302. Accordingly, a relationship between a program guide data search request and a virtual search channel 1302 may be ascertain by a user.

For each of the virtual search channels 1302, graphical data representative of one or more media content instances matching the corresponding program guide data search request (e.g., the respective keyword search term(s) associated with the program guide data search request) may be displayed within the virtual search channel. In the illustrated example, the graphical data representative of the matching media content instances may include textual data representing titles (e.g., "Argentina vs. Peru, World Soccer Championship" in virtual search channel 1302-1 and "Ed, Edd, 'n Eddy" and "Ben 10" in virtual search channel 1302-2) of the matching media content instances.

As shown in FIG. 13, search-based program guide view 1300 may include graphical representations of a plurality of cells 1304 (e.g., cells 1304-1 through 1304-4). Data representative of one or more media content instances identified as matching a program guide data search request may be positioned within one or more of the cells 1304 in search-based program guide view 1300. For example, cell 1304-1 may be associated with and include data representative of a matching television program titled "Argentina vs. Peru, World Soccer Championship."

Cells 1304 may be arranged in search-based program guide view 1300 based on one or more attributes of cells 1304 and/or corresponding matching media content instances. For example, cells 1304 may be arranged in search-based program guide view 1300 based on and/or relative to virtual search channels 1302 associated with the matching media content instances and programming time slots representing time periods during which the matching media content instances are scheduled for transmission.

To this end, search-based program guide view 1300 may include graphical data representative of a plurality of programming time slots arranged along a time axis 1306. As shown in FIG. 13, data representative of a list 1308 of programming time slots may be aligned horizontally along time axis 1306 to form a plurality of vertical time slot columns 1310 (e.g., time slot columns 1310-1 through 1310-3), with each programming time slot corresponding to one of the vertical time slot columns 1310. For example, a programming time slot representative of a thirty-minute time period from 4:30 PM to 5:00 PM corresponds to time slot column 1310-1 in FIG. 13.

Time axis 1306 may include data representative of or otherwise associated with a time block spanning one or more programming time slots. In search-based program guide view 1300, the time block comprises a ninety-minute time block including three thirty-minute time slots spanning a time period between 4:30 PM and 6:00 PM. This time block, which corresponds to a period of time graphically indicated in search-based program guide view 1300, may be referred to as display time block 1312 as depicted in FIG. 13.

In addition, virtual search channels 1302 may be arranged vertically along a channel axis 1314, forming a plurality of horizontal rows 1316 (e.g., rows 1316-1 and 1316-2). In FIG. 13, virtual search channel 1302-1 includes row 1316-1 and virtual search channel 1302-2 includes row 1316-2. While each of the virtual search channels 1302 includes a single row 1316 in FIG. 13, this is illustrative only. In certain examples, a virtual search channel 1302 may include only a single row 1316 such as when matching media content instances associated with the virtual search channel 1302 are associated with only a single media content carrier channel and/or are not associated with any overlapping programming time slots.

Figure 14:
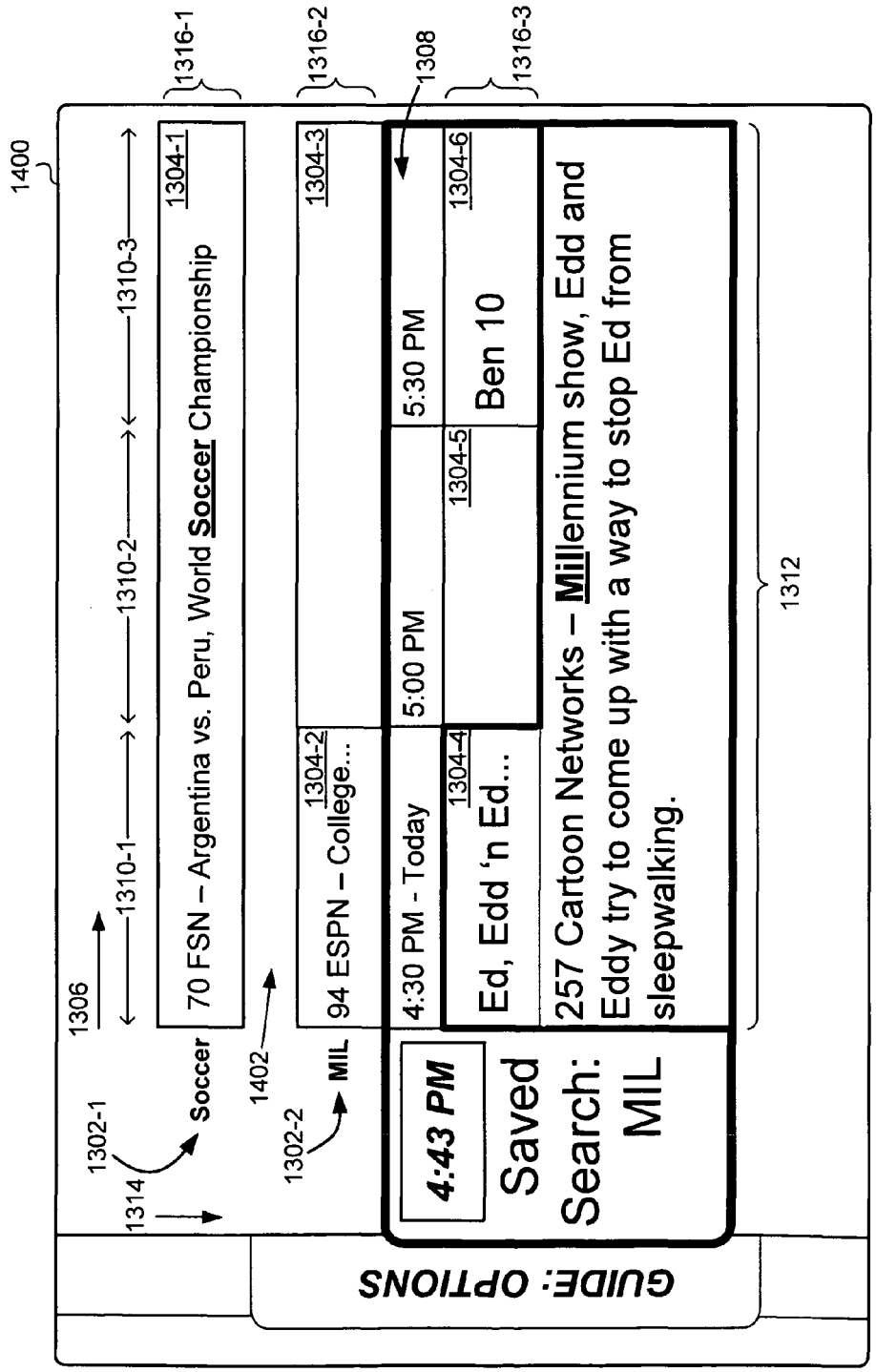
FIG. 14 illustrates another exemplary search-based program guide view displayed in a graphical user interface.

In other examples, matching media content instances associated with a virtual search channel 1302 may be associated with multiple media content channels and overlapping programming time slots. In such examples, the virtual search channel 1302 may include multiple rows representing multiple media content carrier channels. For example, FIG. 14 illustrates another exemplary search-based program guide view 1400 in which virtual search channel 1302-2 includes two rows 1316-2 and 1316-3. As shown, row 1316-2 may be associated with and represent a first media content carrier channel labeled "94 ESPN" associated with at least one matching media content instance (e.g., a television program titled "College Basketball"), and row 1316-3 may be associated with and represent a second media content carrier channel labeled "257 CARTOON" associated with at least one matching media content instance (e.g., television programs titled "Ed, Edd 'n Eddy" and "Ben 10"). Hence, the number of rows 1316 included in a virtual search channel 1302 may expand to accommodate various numbers and configurations of cells 1304 (e.g., cells 1304-2 through 1304-6 for virtual search channel 1302-2 in FIG. 14) and corresponding media content instances determined to match a program guide data search request corresponding to the virtual search channel 1302.

As shown in FIG. 14, a row 1316 and/or a cell 1304 within a row 1316 may include a graphical indication of a media content carrier channel associated with the row 1316 and/or the cell 1304 within the row 1316. For example, cell 1304-1 includes a graphical indication of an associated media content carrier channel labeled "70 FSN." In certain embodiments, each cell 1304 within a row 1316 may be associated with a common media content carrier channel. In other embodiments, certain cells 1304 within a row 1316 may be associated with multiple media content carrier channels where the cells 1304 are associated with non-overlapping time slots.

In FIG. 14, a space 1402 separates data representative of virtual search channel 1302-1 from data representative of virtual search channel 1302-2. While data representative of or otherwise associated with a virtual search channel 1302 may be separated into a block as shown in FIG. 14, this is illustrative only. Other embodiments may omit such separations between virtual search channels.

Virtual search channels 1302 may be arranged along channel axis 1314 in any suitable order and/or configuration. In certain embodiments, access subsystem 104 may be configured to provide one or more tools that may be utilized by a user of access subsystem 104 to customize the order in which virtual search channels 1302 are displayed in search-based program guide view 1300 or 1400.

Additionally or alternatively, access subsystem 104 may be configured to provide one or more tools that may be utilized by a user of access subsystem 104 to select one or more program guide data search requests to be represented in one or more virtual search channels 1302 in search-based program guide view 1300 or 1400. To this end, access subsystem 104 may be configured to save and maintain data representative of received program guide data search requests. Such data may be saved within search guide data 320 shown in FIG. 3.

Graphical data representative of saved search requests may be provided by access subsystem 104 for display and consideration of a user. FIG. 9 illustrates an example of textual data representative of saved search requests displayed in a GUI view 900. In the illustrated example, the saved searches includes keyword searches for "MIL," "Red Sox," "FA-18," and "Soccer."

In certain embodiments, access subsystem 104 may provide one or more tools that may be utilized by a user of access subsystem 104 to select one or more of the saved searches for inclusion in one or more virtual search channels 1302 in search-based program guide view 1300 or 1400. For example, a user may select the saved searches labeled "MIL" and "Soccer," and, in response, access subsystem 104 may generate and provide data representative of search-based program guide view 1300 or 1400 including virtual search channels 1302-1 and 130-1 representative of the "MIL" and "Soccer" search requests, respectively, for display. In certain examples, the generation of the search-based program guide view 1300 or 1400 may include or be preceded by access subsystem 104 searching program guide data 318 for media content instances matching the selected search requests, as described above.

In this or similar manner, access subsystem 104 may enable a user of access subsystem 104 to provide input to customize one or more search-based program guide views that may be generated and provided for display by access subsystem 104. Accordingly, a user may build one or more custom views that may include data representative of media content instances that are of interest to the user.

Figure 15:
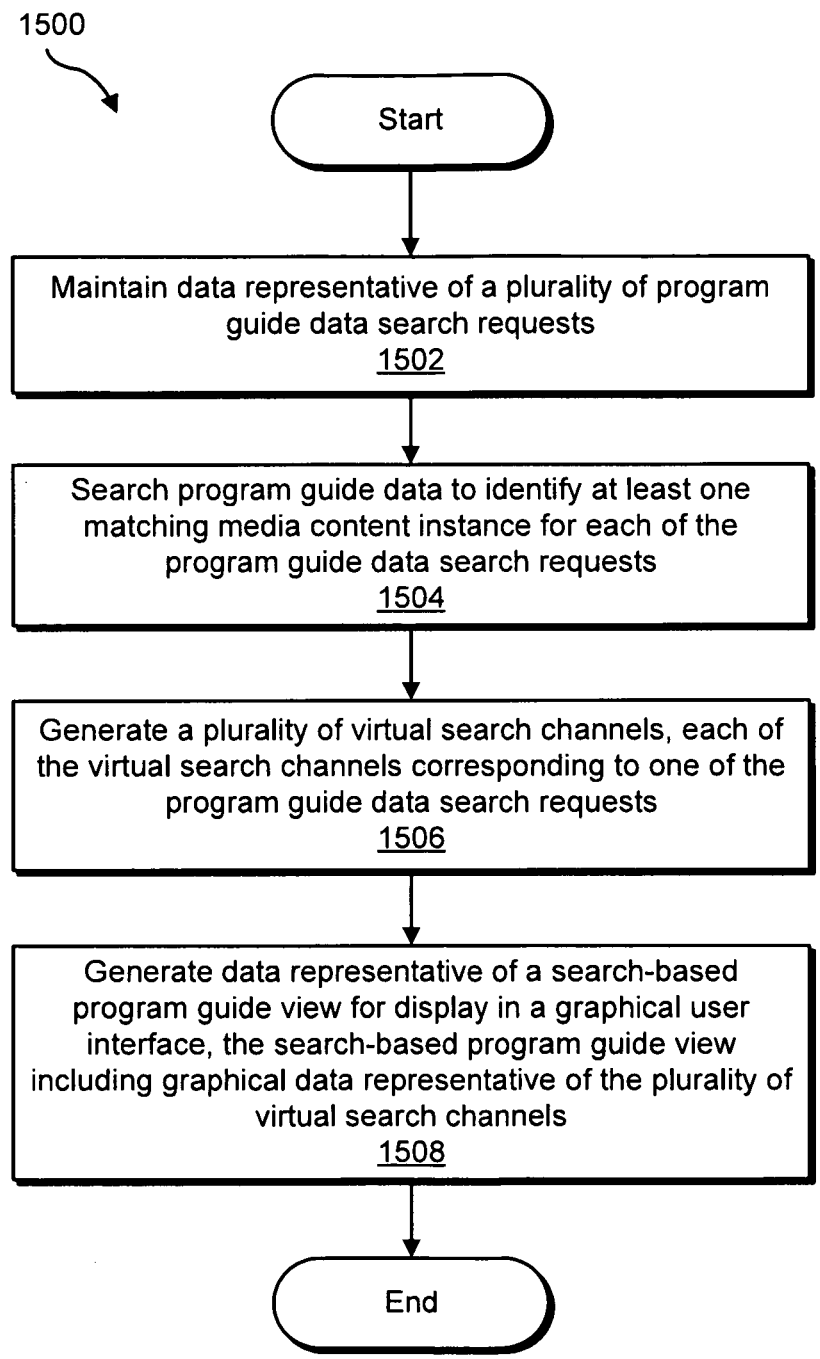
FIG. 15 illustrates another exemplary search-based program guide method.

FIG. 15 illustrates another exemplary search-based program guide method 1500. While FIG. 15 illustrates exemplary steps according to one embodiment, other embodiments may omit, add to, reorder, and/or modify any of the steps shown in FIG. 15. In certain embodiments, one or more of the exemplary steps of method 1500 may be performed by access subsystem 104.

In step 1502, data representative of a plurality of program guide data search requests is maintained. For example, access subsystem 104 may maintain data representative of a plurality of program guide data search requests. The data, which may be included in search guide data 320 in storage facility 306, may represent one or more saved program guide data search requests.

In step 1504, program guide data is searched to identify at least one matching media content instance for each of the program guide data search requests. For example, access subsystem 104 may search program guide data 318 to identify at least one matching media content instance for each of the program guide data search requests. The searching may be performed in any suitable way, including performing one search or multiple searches of program guide data in parallel or serially. In certain embodiments, step 1504 may include restricting one or more searches of program guide data 318 to at least one subset of the program guide data 318. For example, access subsystem 104 may restrict a search to a subset of the program guide data 318 that is associated with a time block (e.g., display time block 1016, 1102, or 1312) corresponding to a time period indicated in a search-based program guide view.

In step 1506, a plurality of virtual search channels is generated, each of the virtual search channels corresponding to one of the program guide data search requests. For example, access subsystem 104 may generate data representative of the plurality of virtual search channels, the virtual search channels including one virtual search channel for each program guide data search request. In certain embodiments, the data representative of the virtual search channels may be included in search guide data 320 in storage facility 306.

In step 1508, data representative of a search-based program guide view is generated for display in a graphical user interface, the search-based program guide view including graphical data representative of the plurality of virtual search channels. For example, access subsystem 104 may generate data representative of a search-based program guide view such as search-based program guide view 1300 or 1400 for display in a graphical user interface. In certain embodiments, graphical data representative of the at least one matching media content instance corresponding to one of virtual search channels may be included within the graphical data representative of the same virtual search channel in the search-based program guide interface.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving a program guide data search request with a media content access subsystem, said program guide data search request including a keyword search term;
searching, by said media content access subsystem, program guide data to identify at least one matching media content instance based on said program guide data search request;
generating, by said media content access subsystem, a virtual search channel associated with said program guide data search request; and
generating, by said media content access subsystem, data representative of a search-based program guide view for display in a graphical user interface, said search-based program guide view exhibiting graphical data representative of said virtual search channel and indicating said keyword search term as being associated with said virtual search channel;
wherein said at least one matching media content instance comprises a plurality of matching media content instances for said virtual search channel graphically represented in said search-based program guide, said virtual search channel comprising
a first row associated with a first media content carrier channel and including graphical data representative of a first subset of said plurality of matching media content instances for said virtual search channel, and
a second row associated with a second media content carrier channel and including graphical data representative of a second subset of said plurality of matching media content instances for said virtual search channel.

2. The method of claim 1, further comprising:
determining a time of said receipt of said program guide data search request;
determining that said time of said receipt of said program guide data search request is within a particular programming time slot;
selecting a time block based on said particular programming time slot, said time block including said particular programming time slot and at least one other programming time slot;
associating, by said media content access subsystem, said selected time block including said particular programming time slot and said at least one other programming time slot with said program guide data search request; and
identifying, by said media content access subsystem from program guide data, a subset of said program guide data that is associated with said selected time block;
wherein said searching of said program guide data comprises restricting said searching to said subset of said program guide data that is associated with said selected time block.

3. The method of claim 2, wherein said associating of said time block with said program guide data search request comprises automatically identifying said selected time block based on a time period associated with said search-based program guide view.

4. The method of claim 2, wherein:
said search-based program guide view exhibits graphical data representative of said particular programming time slot and said at least one other programming time slot included in said selected time block.

5. The method of claim 2, further comprising:
receiving navigational input with said media content access subsystem;
identifying, by said media content access subsystem, another time block based on said navigational input;
identifying, by said media content access subsystem, another subset of said program guide data that is associated with said another time block;
searching, by said media content access subsystem, said another subset of said program guide data that is associated with said another time block to identify at least one other matching media content instance based on said program guide data search request; and
updating, by said media content access subsystem, said search-based program guide view to exhibit graphical data representative of said at least one other matching media content instance.

6. The method of claim 5, wherein said updating comprises:
removing said graphical data representative of said at least one matching media content instance from said search-based program guide view; and
adding said graphical data representative of said at least one other matching media content instance to said search-based program guide view.

7. The method of claim 5, further comprising scrolling, by said media content access subsystem, said search-based program guide view along a time axis to transition from a display of said selected time block to a display of said another time block in said search-based program guide view in response to said navigational input.

8. The method of claim 2, wherein said search-based program guide view comprises:
graphical data representative of at least said particular programming time slot arranged along a time axis;
said graphical data representative of said virtual search channel arranged along a channel axis; and
within said virtual search channel, at least one cell including graphical data representative of said at least one matching media content instance.

9. The method of claim 8, wherein said at least one cell comprises a plurality of cells, at least one of said plurality of cells comprising an empty placeholder cell representing at least one other media content instance not matching said program guide data search request.

10. The method of claim 1, tangibly embodied as computer-executable instructions on at least one non-transitory computer-readable medium.

11. A method comprising:
maintaining, by a media content access subsystem, data representative of a plurality of program guide data search requests including at least one keyword search term associated with each one of said plurality of program guide data search requests;
searching, by said media content access subsystem, program guide data to identify at least one matching media content instance for each of said program guide data search requests based on said at least one keyword search term for each one of said plurality of said program guide data search requests;
generating, by said media content access subsystem, a plurality of virtual search channels, each of said virtual search channels corresponding to one of said program guide data search requests based on said at least one keyword search term for said one of said program guide data search requests; and generating, by said media content access subsystem, data representative of a search-based program guide view for display in a graphical user interface, said search-based program guide view including graphical data representative of said plurality of virtual search channels and indicating said at least one keyword search term for each of said plurality of said virtual search channels, and, within each of said virtual search channels, graphical data representative of said at least one matching media content instance;

wherein said at least one matching media content instance comprises a plurality of matching media content instances for a virtual search channel included in said plurality of virtual search channels graphically represented in said search-based program guide, said virtual search channel comprising
- a first row associated with a first media content carrier channel and including graphical data representative of a first subset of said plurality of matching media content instances for said virtual search channel, and
- a second row associated with a second media content carrier channel and including graphical data representative of a second subset of said plurality of matching media content instances for said virtual search channel.

12. The method of claim 11, wherein said searching of said program guide data comprises restricting said searching to a subset of said program guide data associated with a time block corresponding to a time period indicated in said search-based program guide view.

13. The method of claim 11, wherein said search-based program guide view comprises:
graphical data representative of at least one programming time slot arranged along a time axis;
graphical data representative of said plurality of virtual search channels arranged along a channel axis; and
within each of said virtual search channels, graphical data representative of at least one cell including said graphical data representative of said at least one matching media content instance.

14. The method of claim 11, wherein one of said virtual search channels comprises graphical data representative of a single row corresponding to at least one media content carrier channel associated with said at least one matching media content instance corresponding to said one of said virtual search channels.

15. A system comprising:
at least one computing device comprising a processor and including:
a processing facility;
a storage facility communicatively coupled to said processing facility, said storage facility storing program guide data;
a search guide facility communicatively coupled to said processing facility and that directs said processing facility to
receive a program guide data search request that includes a keyword search term,
search program guide data to identify at least one matching media content instance based on said program guide data search request,
generate a virtual search channel associated with said program guide data search request, and
generate and provide data representative of a search-based program guide view for display in a graphical user interface, said search-based program guide view exhibiting graphical data representative of said virtual search channel and indicating said keyword search term as being associated with said virtual search channel;
wherein said at least one matching media content instance comprises a plurality of matching media content instances for said virtual search channel graphically represented in said search-based program guide, said virtual search channel comprising
a first row associated with a first media content carrier channel and including graphical data representative of a first subset of said plurality of matching media content instances for said virtual search channel, and
a second row associated with a second media content carrier channel and including graphical data representative of a second subset of said plurality of matching media content instances for said virtual search channel.

16. The system of claim 15, wherein said search guide facility further directs said processing facility to
determine a time of said receipt of said program guide data search request,
determine that said time of said receipt of said program guide data search request is within a particular programming time slot;
select a time block based on said particular programming time slot, said time block including said particular programming time slot and at least one other programming time slot,
associate said selected time block including said particular programming time slot and said at least one other time slot with said program guide data search request, and
identify, from said program guide data, a subset of said program guide data that is associated with said selected time block,
wherein said search of said program guide data is restricted to said subset of said program guide data that is associated with said selected time block.

17. The system of claim 16, wherein said time block comprises a display time block spanning a time period indicated in said search-based program guide view.

18. The system of claim 16, wherein said search guide facility further directs said processing facility to
identify another time block based on navigational input,
identify another subset of said program guide data that is associated with said another time block,
search said another subset of said program guide data that is associated with said another time block to identify at least one other matching media content instance based on said program guide data search request, and
update said data representative of said search-based program guide view to exhibit graphical data representative of said at least one other matching media content instance in said search-based program guide view.

19. The system of claim 18, wherein said search guide facility further directs said processing facility to scroll said search-based program guide view along a time axis to transition from a display of said selected time block to a display of said another time block in said search-based program guide view in response to said navigational input.

20. The system of claim 16, wherein said search-based program guide view comprises:

graphical data representative of at least said particular programming time slot arranged along a time axis;

said graphical data representative of said virtual search channel arranged along a channel axis; and within said virtual search channel, at least one cell including graphical data representative of said at least one matching media content instance.

21. A system comprising:

at least one computing device comprising a processor and including:

a processing facility;

a storage facility communicatively coupled to said processing facility, said storage facility storing program guide data;

a search guide facility communicatively coupled to said processing facility and that directs said processing facility to maintain data representative of a plurality of program guide data search requests including at least one keyword search term associated with each one of said plurality of program guide data search requests, search said program guide data to identify at least one matching media content instance for each of said program guide data search requests based on said at least one keyword search term for each one of said plurality of said program guide data search requests, generate a plurality of virtual search channels, each of said virtual search channels corresponding to one of said program guide data search requests, and generate data representative of a search-based program guide view for display in a graphical user interface, said search-based program guide view including graphical data representative of said plurality of virtual search channels and indicating said at least one keyword search term for each of said plurality of said virtual search channels, and, within each of said virtual search channels, graphical data representative of said at least one matching media content instance, wherein said at least one matching media content instance comprises a plurality of matching media content instances for a virtual search channel included in said plurality of virtual search channels graphically represented in said search-based program guide, said virtual search channel comprising a first row associated with a first media content carrier channel and including graphical data representative of a first subset of said plurality of matching media content instances for said virtual search channel, and a second row associated with a second media content carrier channel and including graphical data representative of a second subset of said plurality of matching media content instances for said virtual search channel.

* * * * *